United States Patent
Censi et al.

(10) Patent No.: US 11,945,440 B2
(45) Date of Patent: Apr. 2, 2024

(54) DATA DRIVEN RULE BOOKS

(71) Applicant: Motional AD LLC, Boston, MA (US)

(72) Inventors: Andrea Censi, Somerville, MA (US); Kostyantyn Slutskyy, Singapore (SG); Asvathaman Asha Devi, Singapore (SG); Chua Zhe Xuan, Singapore (SG); Zhiliang Chen, Singapore (SG)

(73) Assignee: Motional AD LLC, Boston, MA (US)

( * ) Notice: Subject to any disclaimer, the term of this patent is extended or adjusted under 35 U.S.C. 154(b) by 327 days.

(21) Appl. No.: 16/996,785

(22) Filed: Aug. 18, 2020

(65) Prior Publication Data

US 2021/0053569 A1  Feb. 25, 2021

Related U.S. Application Data

(60) Provisional application No. 62/891,002, filed on Aug. 23, 2019.

(51) Int. Cl.
  *B60W 30/18* (2012.01)
  *G05D 1/00* (2006.01)
  *G08G 1/01* (2006.01)

(52) U.S. Cl.
  CPC ......... *B60W 30/18159* (2020.02); *B60W 30/18163* (2013.01); *G05D 1/0088* (2013.01);
  (Continued)

(58) Field of Classification Search
  CPC ..... B60W 30/18159; B60W 30/18163; B60W 2400/00; B60W 2520/10;
  (Continued)

(56) References Cited

U.S. PATENT DOCUMENTS 9,645,577 B1  5/2017 Frazzoli et al.
10,254,759 B1  4/2019 Faust
(Continued)

FOREIGN PATENT DOCUMENTS

CN  109426696  3/2019
CN  109491375  3/2019
(Continued)

OTHER PUBLICATIONS

Ames et al., "Control Barrier Function based Quadratic Programs with Application to Adaptive Cruise Control," Presented at the Proceedings of 2014 IEEE 53rd Annual Conference on Decision and Control (CDC), Los Angeles, CA, Dec. 15-17, 2014; 53rd IEEE Conference on Decision and Control, 2014, pp. 6271-6278.
(Continued)

*Primary Examiner* — Yuen Wong
(74) *Attorney, Agent, or Firm* — Fish & Richardson P.C.

(57) ABSTRACT

The current disclosure provides techniques for using human driving behavior to assist in decision making of an autonomous vehicle as the autonomous vehicle encounters various scenarios on the road. For each scenario, a model may be generated based on human driving behavior that governs how an autonomous vehicle maneuvers in that scenario. As a result of using these models, reliability and safety of autonomous vehicle may be improved. In addition, because the model is programmed into the autonomous vehicle, the autonomous vehicle, in many instances, need not consume resources to implement complex calculations to determine driving behavior in real-time.

18 Claims, 25 Drawing Sheets

(52) U.S. Cl.
CPC ......... *G05D 1/0214* (2013.01); *G08G 1/0133* (2013.01); *G08G 1/0145* (2013.01); *B60W 2400/00* (2013.01); *B60W 2520/10* (2013.01); *B60W 2554/802* (2020.02)

(58) Field of Classification Search
CPC ... B60W 2554/802; B60W 2050/0075; B60W 40/09; B60W 60/0013; B60W 2556/05; B60W 2556/10; B60W 2555/60; B60W 30/18154; B60W 40/00; B60W 60/0011; B60W 30/10; B60W 40/04; B60W 50/14; B60W 60/0015; B60W 60/0051; B60W 2050/0005; B60W 2050/0064; B60W 2050/146; B60W 2420/00; B60W 2520/06; B60W 2540/30; B60W 2554/4042; G05D 1/0088; G05D 1/0214; G05D 1/00; G05D 1/0011; G05D 1/0061; G05D 1/0212; G05D 2201/0213; G08G 1/0133; G08G 1/0145; G08G 1/0112; G08G 1/00; G06F 30/20; B60K 35/00; B60K 2370/152; B60K 2370/175; B60Y 2300/12; B60Y 2300/18158; B60Y 2300/18166
See application file for complete search history.

(56) References Cited

U.S. PATENT DOCUMENTS

| | | | |
|---|---|---|---|
| 11,008,000 | B2 | 5/2021 | Chang et al. |
| 2009/0109061 | A1 | 4/2009 | McNew et al. |
| 2015/0286219 | A1 | 10/2015 | Reichel et al. |
| 2017/0277193 | A1 | 9/2017 | Frazzoli et al. |
| 2018/0052458 | A1 | 2/2018 | Tsuji et al. |
| 2018/0348755 | A1 | 12/2018 | Yamaguchi et al. |
| 2019/0011917 | A1 | 1/2019 | Kuffner, Jr. |
| 2019/0012910 | A1 | 1/2019 | Kuffner, Jr. |
| 2019/0079527 | A1 | 3/2019 | Censi et al. |
| 2019/0088148 | A1* | 3/2019 | Jacobus ............ G08G 1/096716 |
| 2019/0185019 | A1 | 6/2019 | Cho et al. |
| 2019/0220028 | A1 | 7/2019 | Anderson |
| 2019/0257661 | A1 | 8/2019 | Stentz et al. |
| 2020/0088536 | A1 | 3/2020 | Schlueter et al. |
| 2020/0189575 | A1 | 6/2020 | Wongpiromsarn et al. |
| 2020/0192391 | A1 | 6/2020 | Vora et al. |
| 2020/0211394 | A1 | 7/2020 | King et al. |
| 2022/0080962 | A1 | 3/2022 | Bin-Nun et al. |
| 2022/0126876 | A1 | 4/2022 | Tebbens et al. |
| 2023/0221128 | A1 | 7/2023 | Collin et al. |

FOREIGN PATENT DOCUMENTS

| | | |
|---|---|---|
| DE | 102017210252 | 12/2017 |
| EP | 3722908 | 10/2020 |
| JP | 2009101733 | 5/2009 |
| JP | 2017138953 | 8/2017 |
| JP | 2019006280 | 1/2019 |
| JP | 2019528499 | 10/2019 |
| JP | 2020521978 | 7/2020 |
| KR | 1020070043702 | 4/2007 |
| KR | 1020090054417 | 5/2009 |
| KR | 1020150066303 | 6/2015 |
| KR | 1020180086632 | 8/2018 |
| KR | 1020190054374 | 5/2019 |
| KR | 1020190072235 | 6/2019 |
| KR | 1020200019696 | 2/2020 |
| KR | 1020210065409 | 6/2021 |
| WO | WO 2016130719 | 8/2016 |
| WO | WO 2018138980 | 8/2018 |
| WO | WO 2018220439 | 12/2018 |

OTHER PUBLICATIONS

[No Author Listed], "SAE International: Surface Vehicle Recommended Practice," J3016, Sep. 30, 2016, 30 pages.

Bemporad et al., "Model predictive control based on linear programming—the explicit solution," IEEE Transactions on Automatic Control, Dec. 2002, 47:1974-1985.

Borrelli et al., "Predictive Control for Linear and Hybrid Systems," Oct. 26, 2016, Cambridge University Press, 458 pages.

Slutsky et al., "Hierarchical Multiobjective Shortest Path Problems," 14th International Workshop on the Algorithmic Foundations of Robotics (WAFR), Oulu, Finland, Jun. 21-23, 2021; Algorithmic Foundations of Robotics XIV Proceedings of the Fourteenth Workshop on the Algorithmic Foundations of Robotics, 2021, 17:261-276.

Xue et al., "Scene understanding and autonomous movement of autonomous vehicles," Unmanned System Technology, 2018, 2:24-33 (with English abstract).

* cited by examiner

DATA DRIVEN RULE BOOKS

PRIORITY

This application claims priority to and the benefit of U.S. Application Ser. No. 62/891,002, filed on Aug. 23, 2019, the contents of which is incorporated here by reference in its entirety.

FIELD OF THE INVENTION

This description relates to data driven rule books.

BACKGROUND

Autonomous vehicles have benefits over human-drive vehicles, e.g., reducing road fatalities, traffic congestion, parking congestion, and fuel efficiency. In making driving decisions, typical autonomous vehicle systems take account of objects-such as other vehicles and obstacles-of the surrounding environment that the autonomous vehicle system knows are in the environment of the vehicle by utilizing sensor data. However, autonomous vehicle systems can benefit from using data on human driving behavior.

SUMMARY

In general, the current disclosure provides techniques for using human driving behavior to assist in decision making of an autonomous vehicle as the autonomous vehicle encounters various scenarios on the road. More specifically, the current disclosure discusses, among others, embodiments for modeling human behavior while driving through an uncontrolled traffic junction, while driving past a parked vehicle, and driving in the presence of a jaywalker.

These and other aspects, features, and embodiments can be expressed as methods, apparatus, systems, components, program products, means or steps for performing a function, and in other ways, and will become apparent from the following descriptions, including the claims.

DETAILED DESCRIPTION

Figure 1:
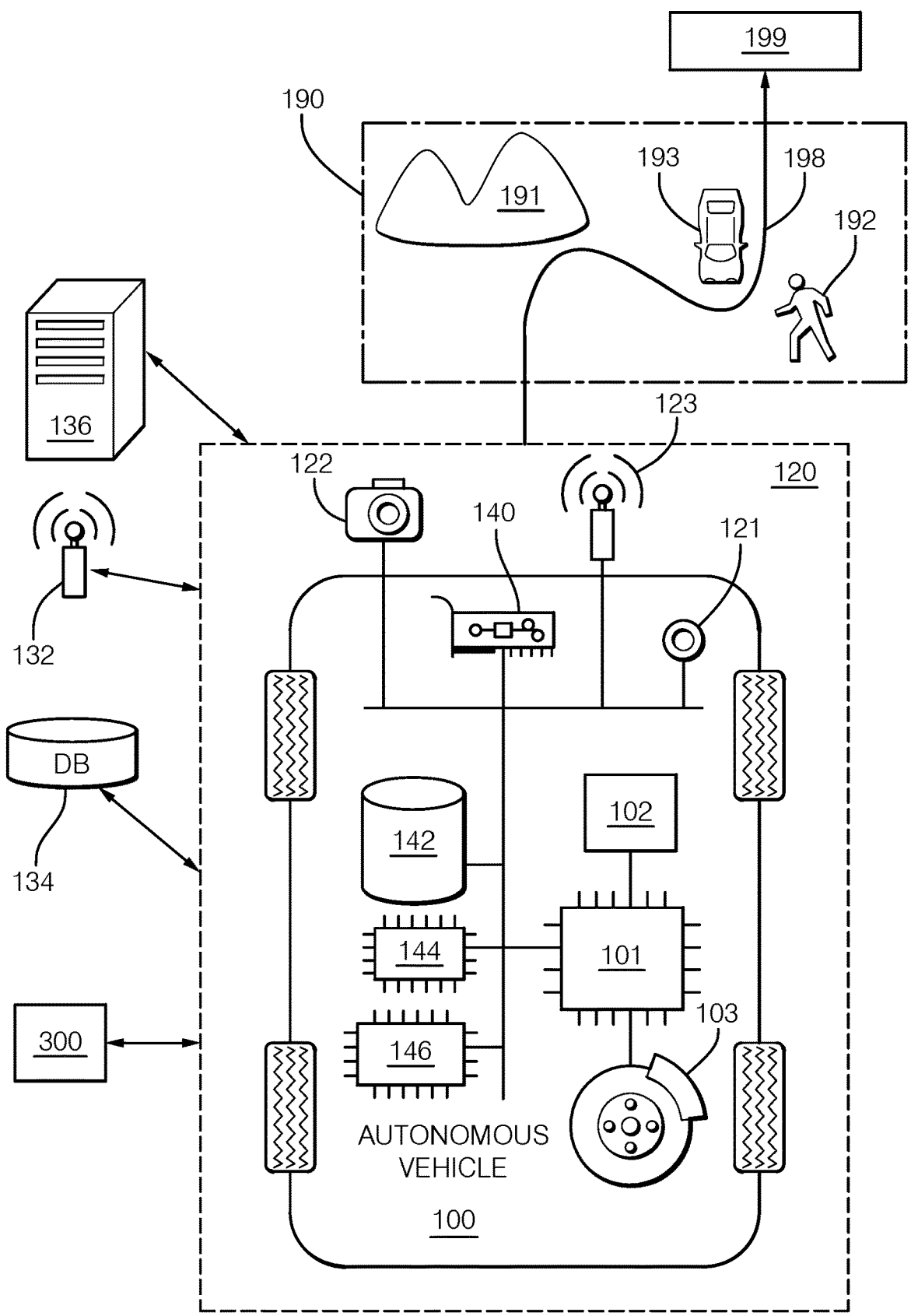
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:
1. General Overview
2. System Overview
3. Autonomous Vehicle Architecture
4. Autonomous Vehicle Inputs
5. Autonomous Vehicle Planning
6. Autonomous Vehicle Control
7. Modeling human driving behavior through an uncontrolled traffic intersection
8. Modeling human driving behavior to drive past a stationary vehicle
9. Modeling human driving behavior to avoid a jaywalker
10. Using the models of human driving behavior in an autonomous vehicle
11. Generating models for human driving behavior using neural networks General Overview In general, the current disclosure provides techniques for using human driving behavior to assist in decision making of an autonomous vehicle as the autonomous vehicle encounters various scenarios on the road. For each scenario, a model may be generated based on human driving behavior that governs how an autonomous vehicle maneuvers in that scenario. As a result of using these models, reliability and safety of autonomous vehicle may be improved. In addition, because the model is programmed into the autonomous vehicle, the autonomous vehicle, in many instances, need not consume resources to implement complex calculations to determine driving behavior in real-time.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, the devices may include wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
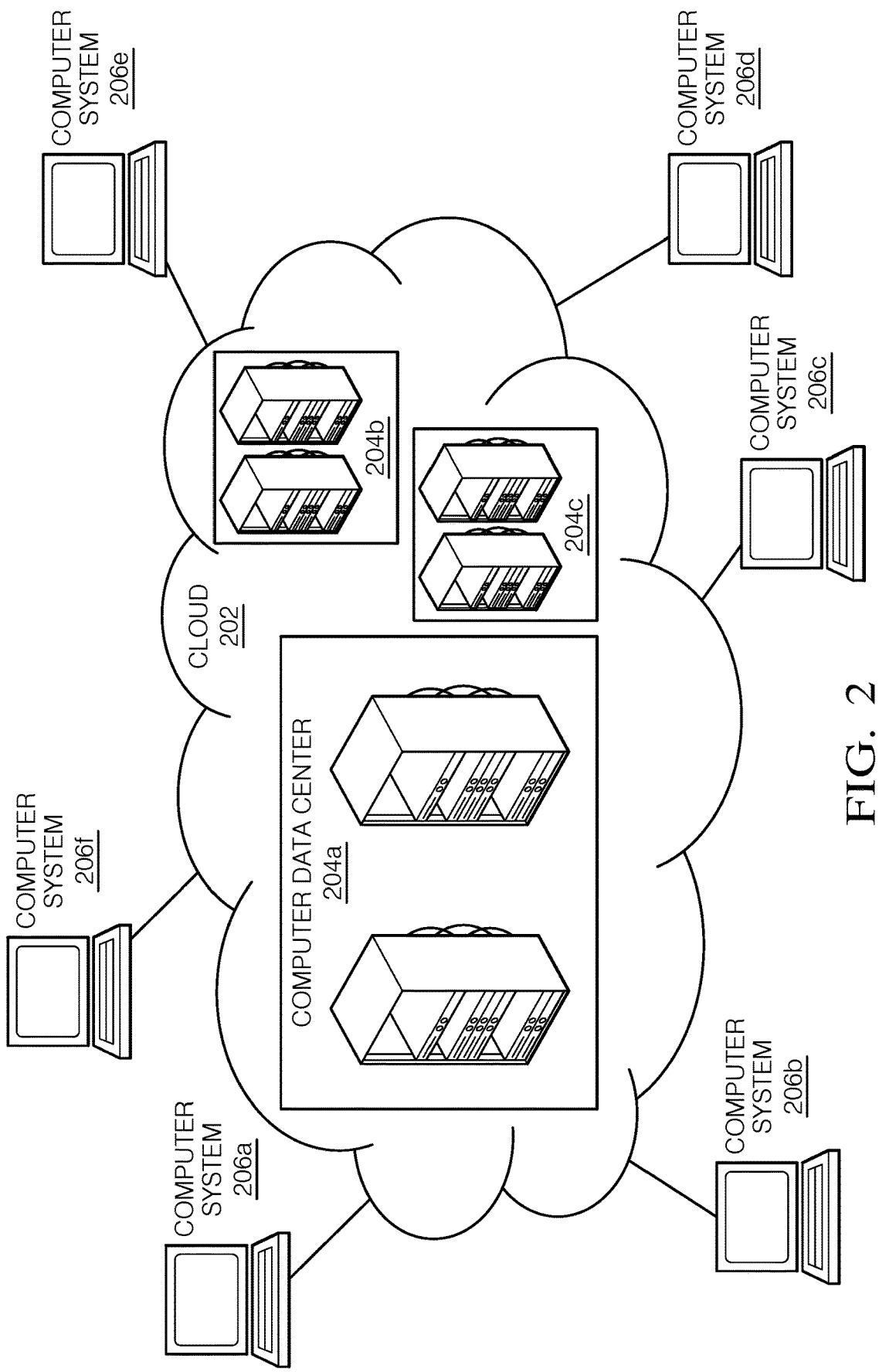
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
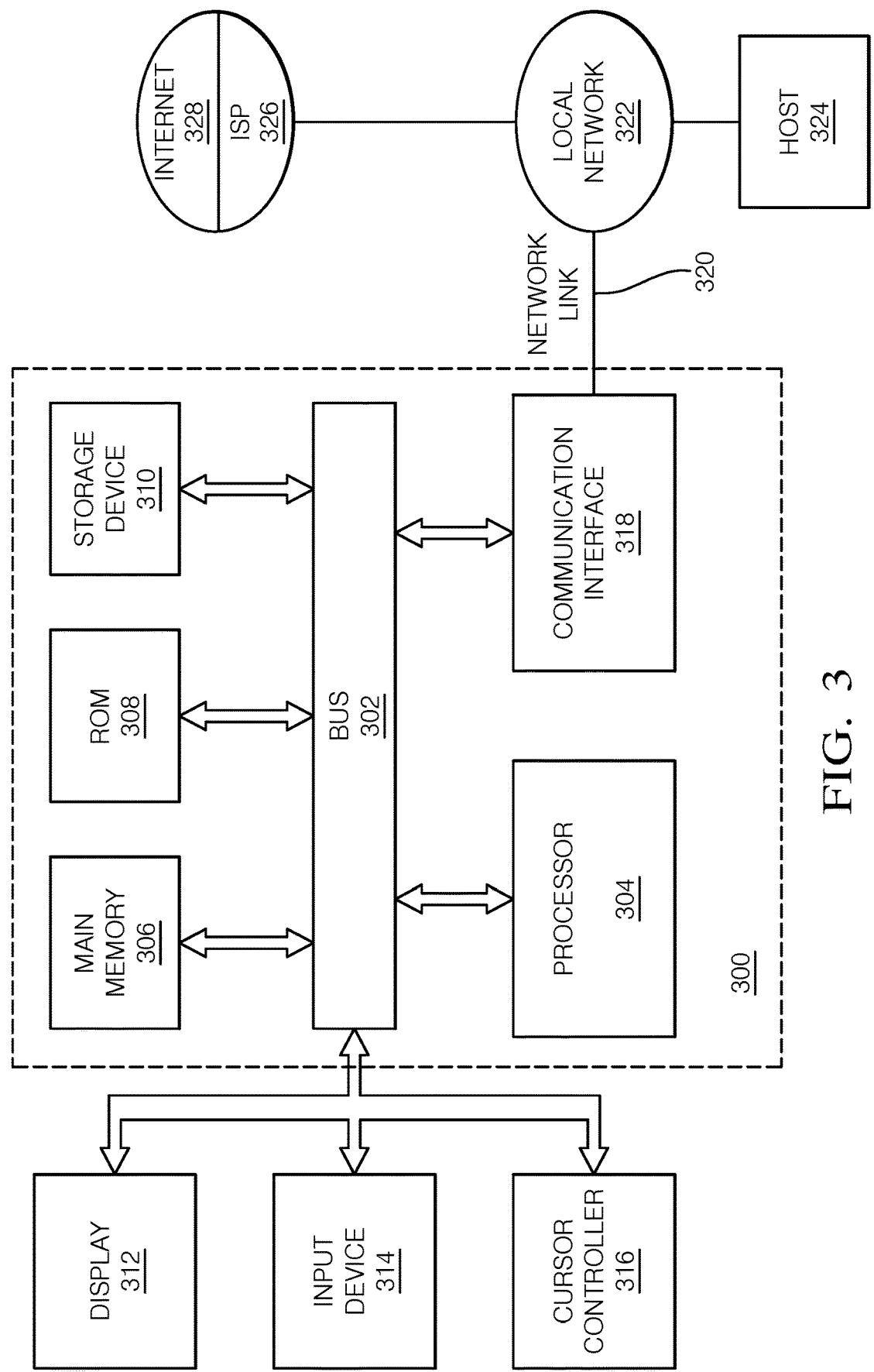
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
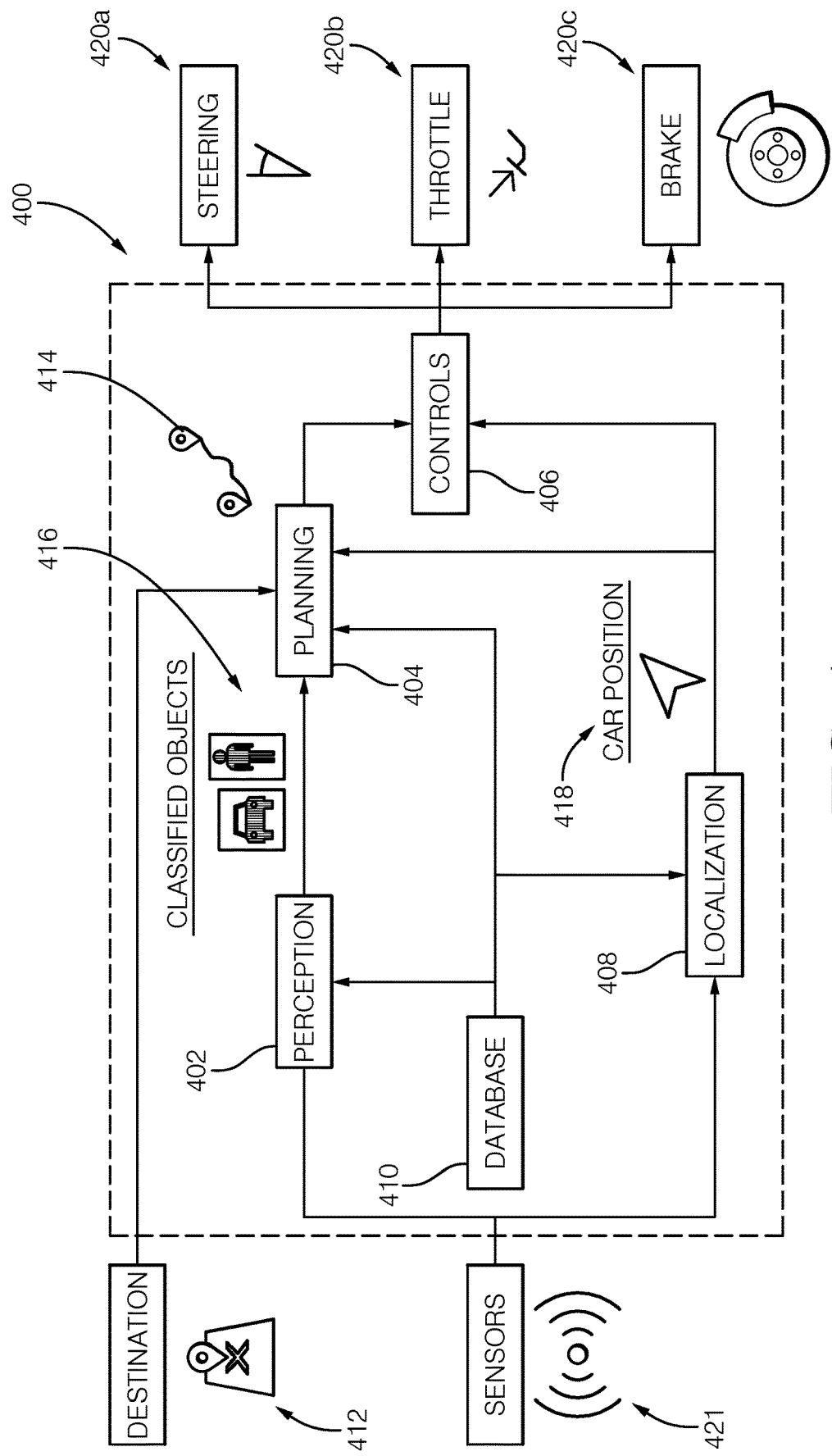
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418. The control module 406 operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
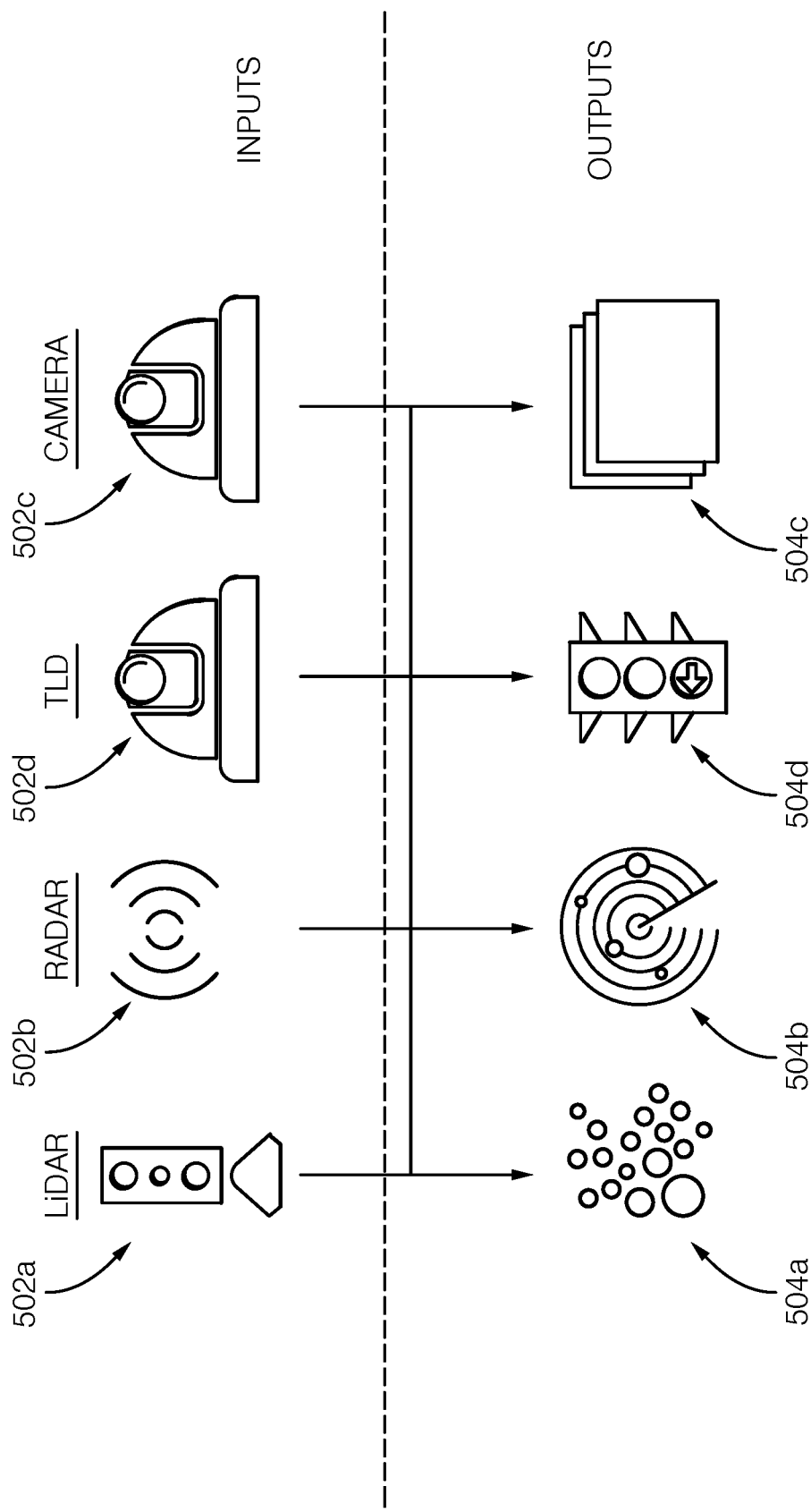
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
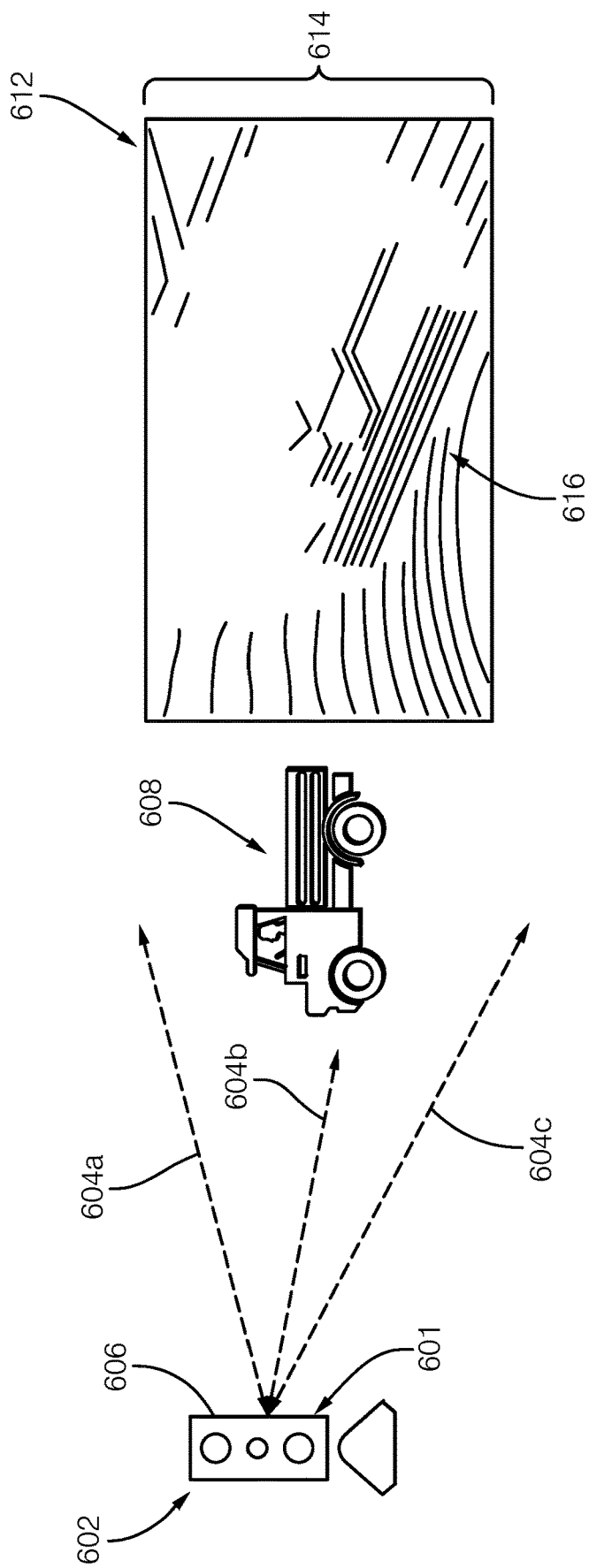
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
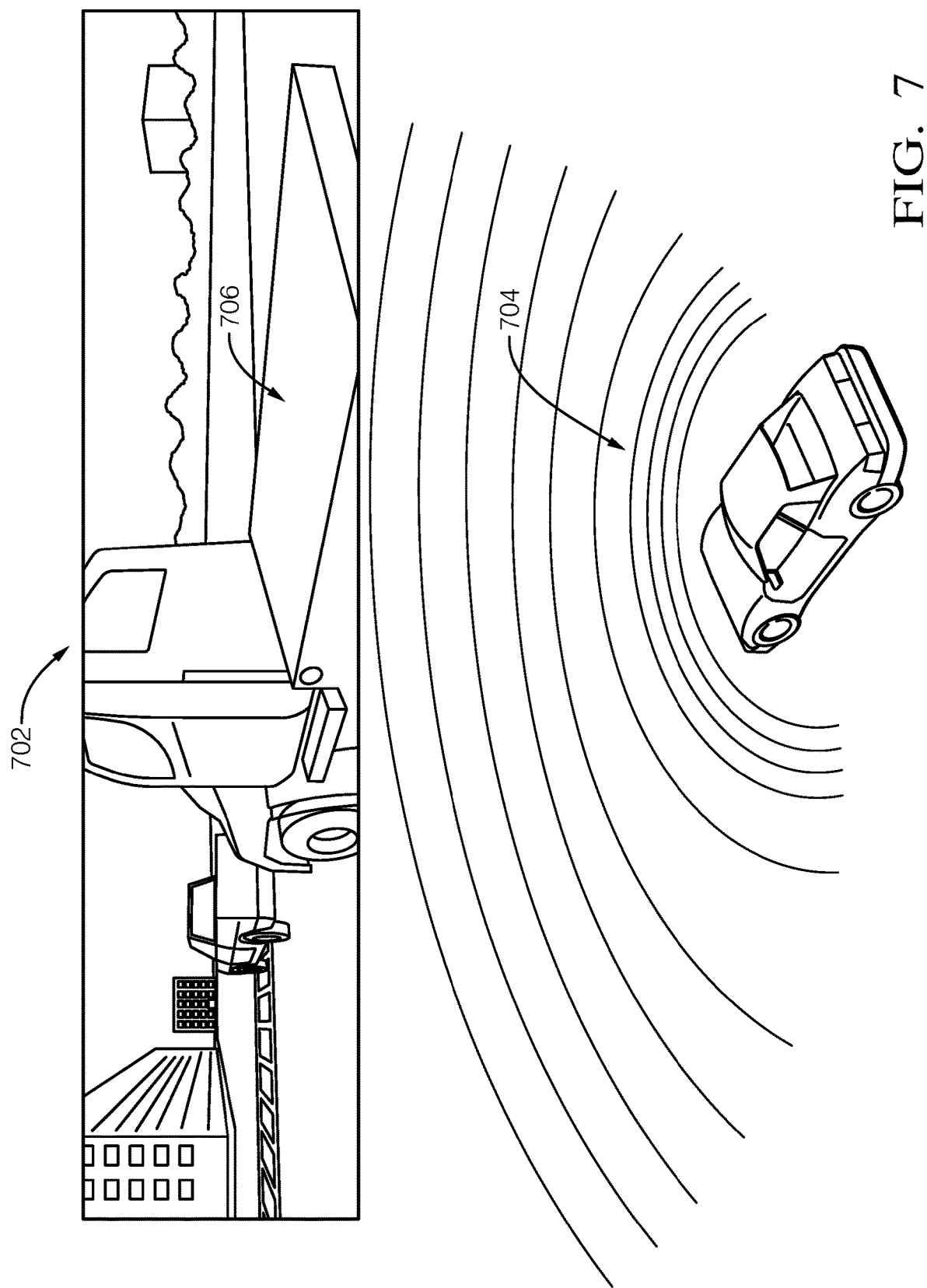
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
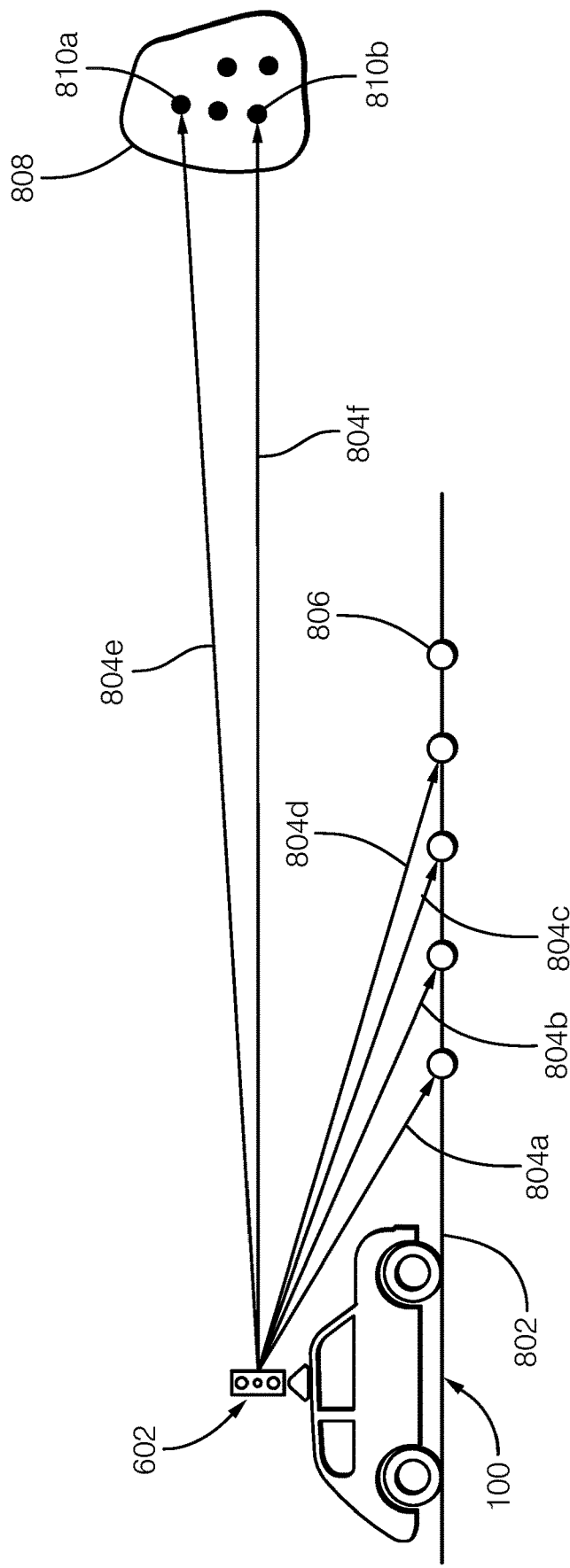
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Autonomous Vehicle Planning

Figure 9:
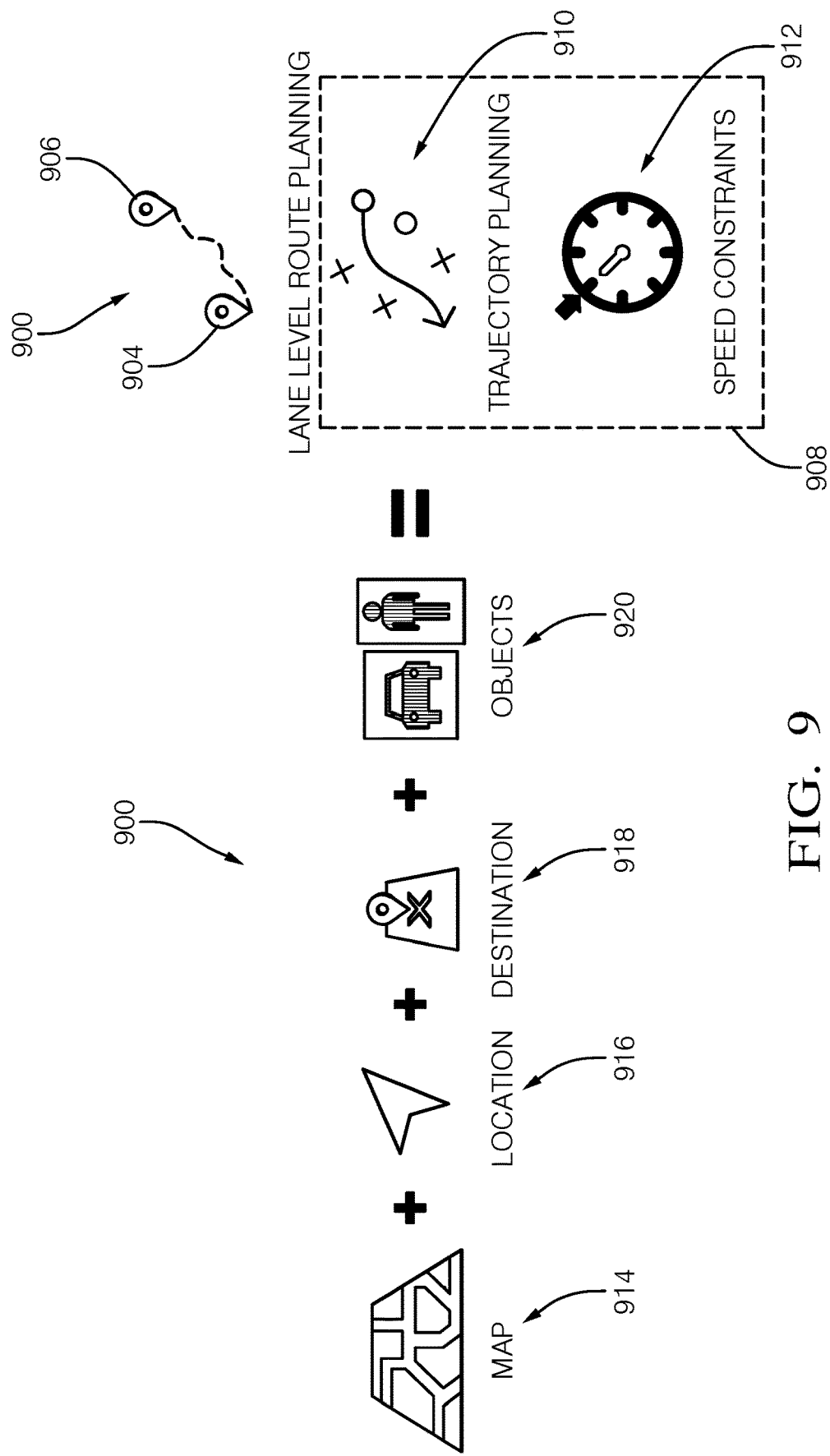
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
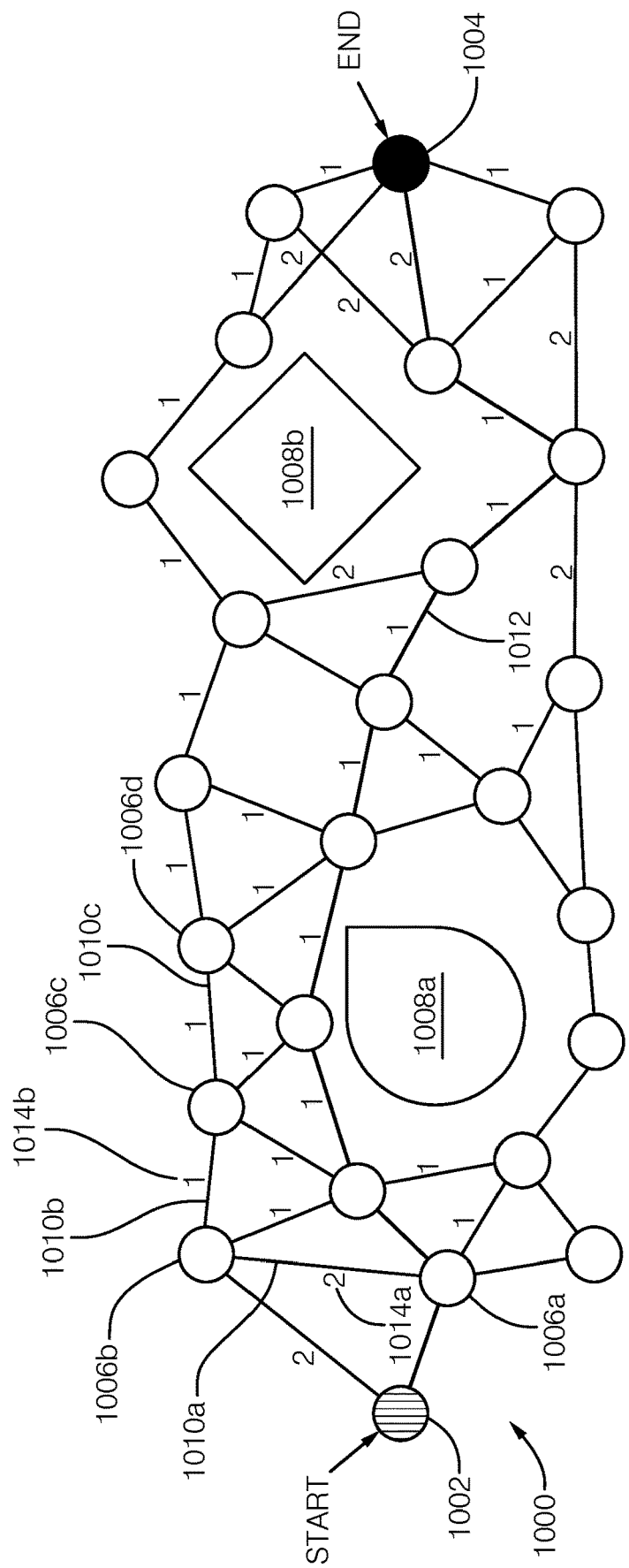
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006*a-d* represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are a static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value or a tuple of values that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together. In other embodiments other operations may be applied.

Autonomous Vehicle Control

Figure 11:
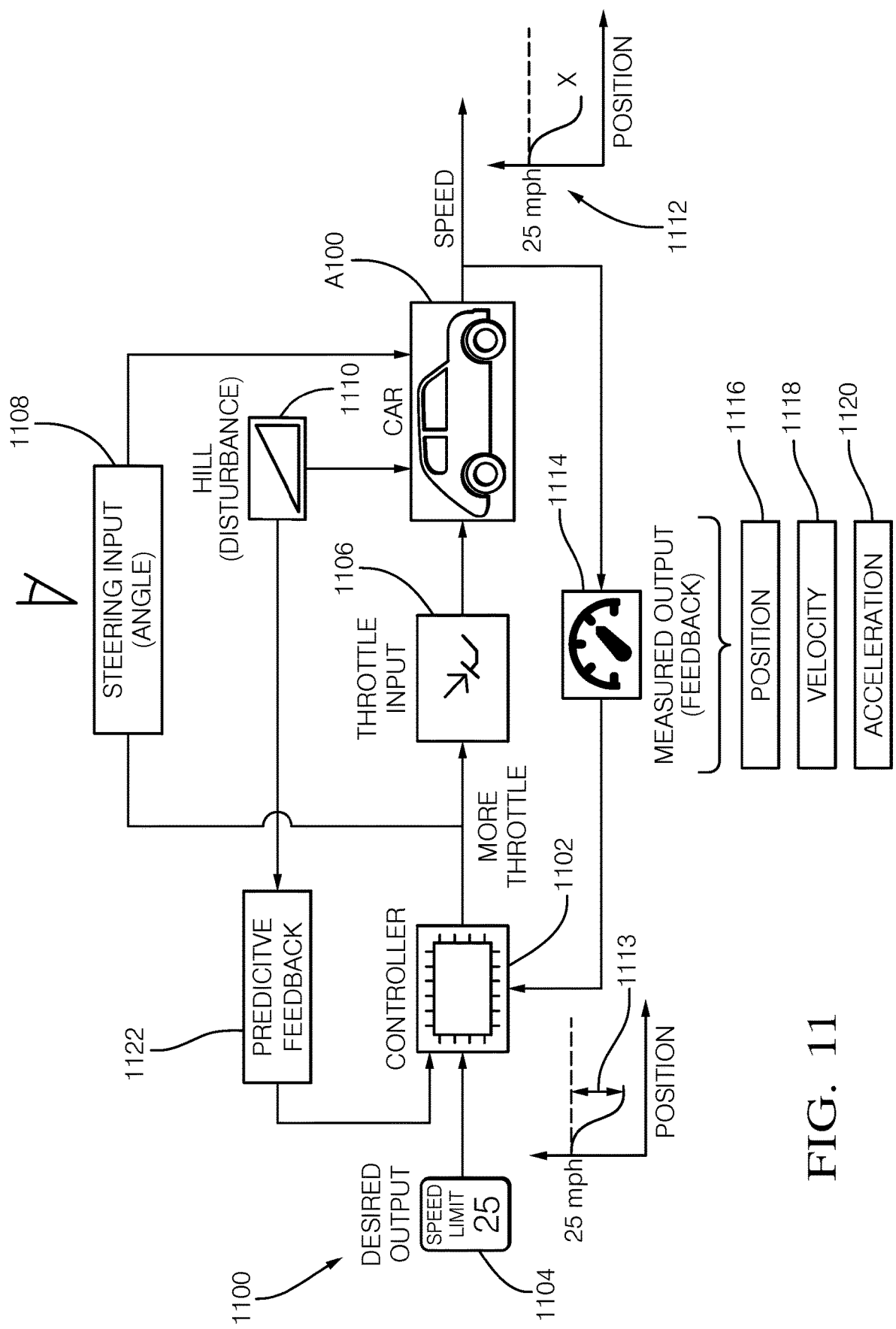
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
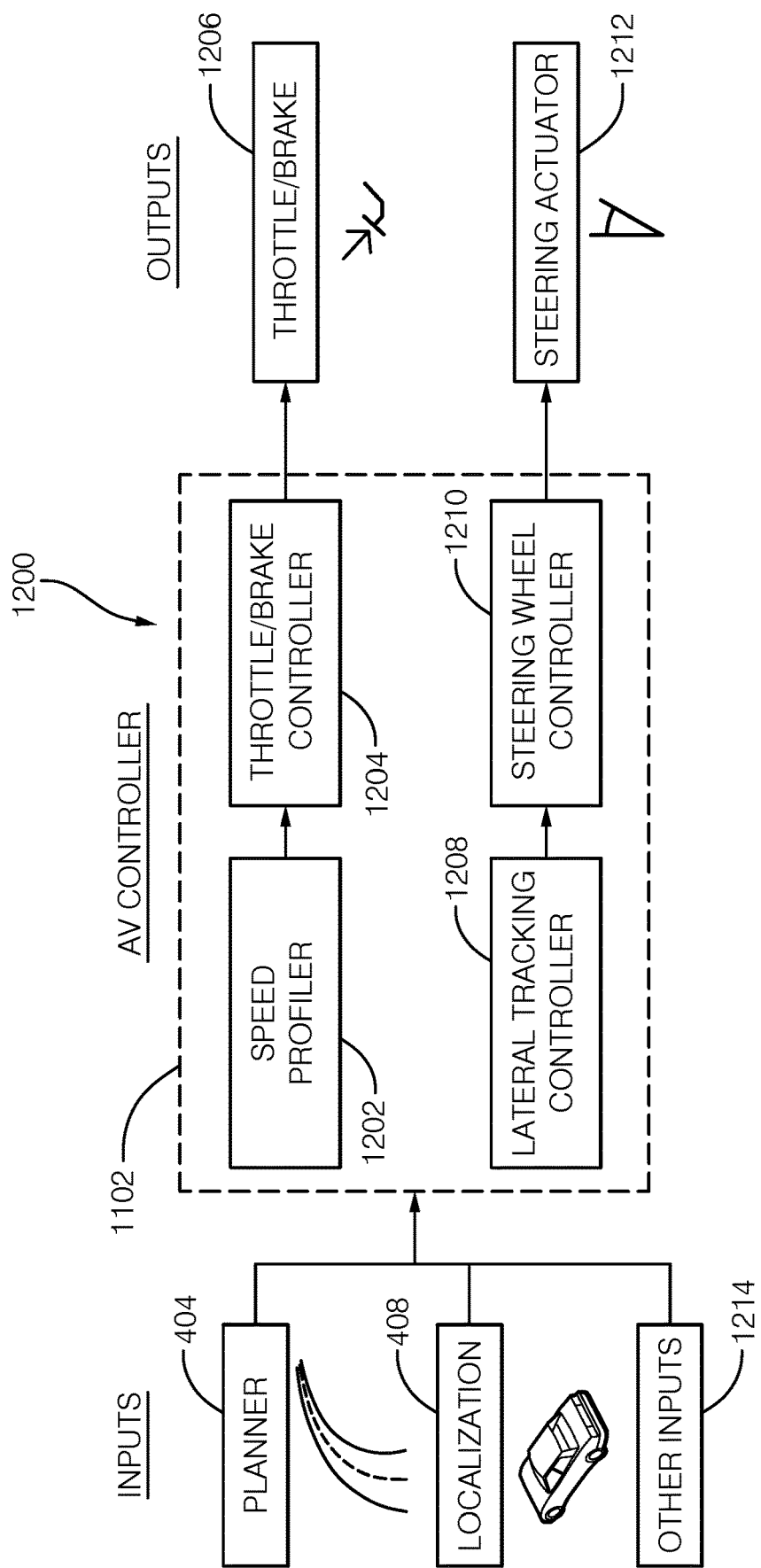
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Modeling Human Driving Behavior Through an Uncontrolled Traffic Intersection

For an autonomous vehicle, driving through uncontrolled traffic intersection is challenging for various reasons. For example, the autonomous vehicle must, in addition to calculating in real time, speeds of crossing vehicles, determine whether there is enough time to merge in order to avoid a collision. Those calculations must be made in real time requiring either a large amount of processing power in the autonomous vehicle or, when processing is done at a server, a fast connection to the server. Therefore, generating a model (e.g., a set of rules) for driving through an uncontrolled traffic intersection enables an autonomous vehicle to use less processing power and/or network connectivity.

Figure 13:
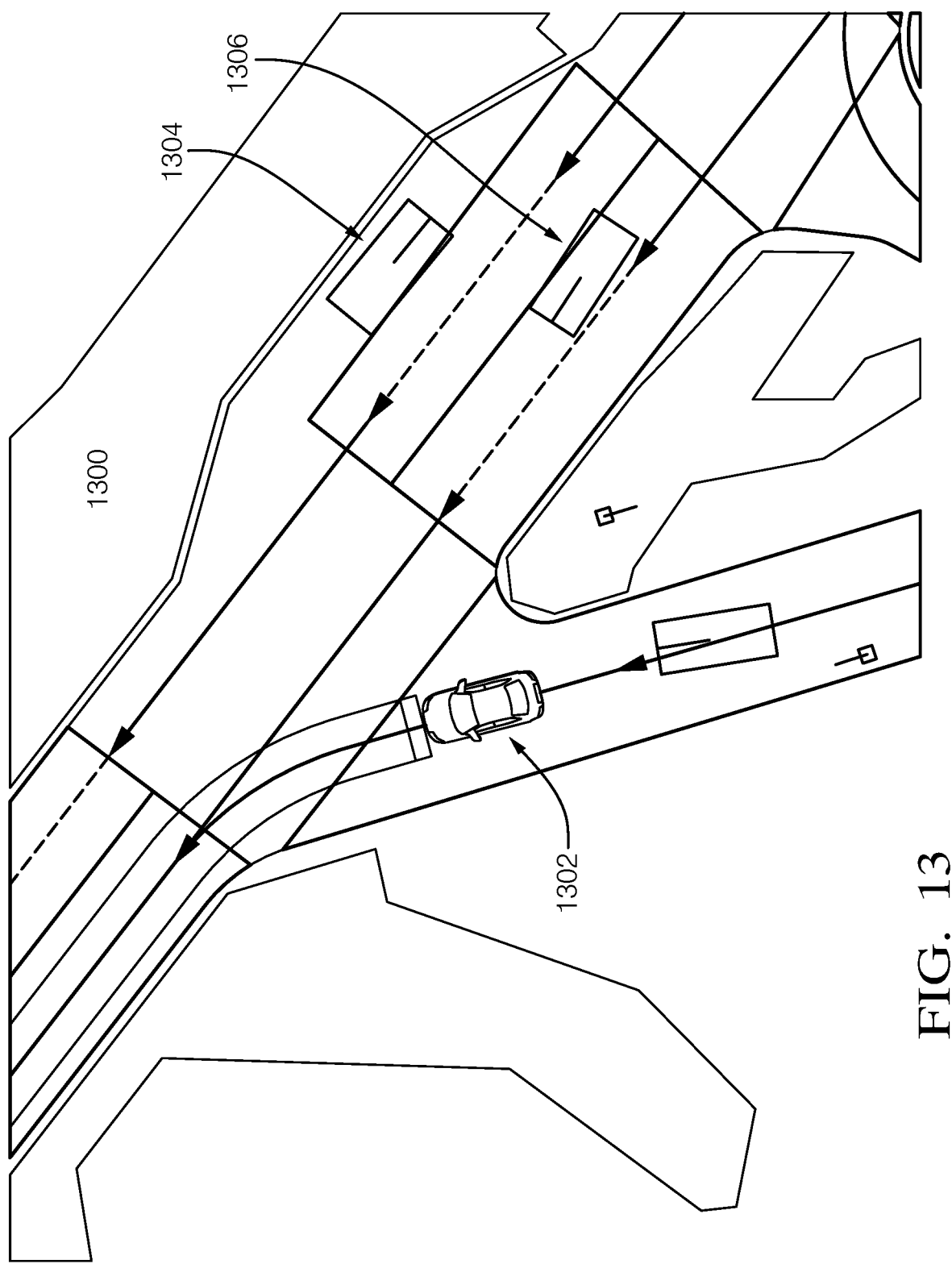
FIG. 13 illustrates an example of an autonomous vehicle attempting to merge at an uncontrolled traffic intersection.

FIG. 13 illustrates an example of an autonomous vehicle attempting to merge at an uncontrolled traffic intersection. The autonomous vehicle 1302 is illustrated as awaiting to merge into intersection 1300. At this point, the autonomous vehicle 1302 has to perform calculations in order to determine whether merging into the intersection. Specifically, the autonomous vehicle 1302 has to determine whether merging into the intersection 1300 would cause the autonomous vehicle 1302 to crash with one or more of the other vehicles 1304 and 1306 approaching the intersection 1300. In addition, the autonomous vehicle 1302 may determine whether merging into the intersection 1300 would cause one or more of the other vehicles (e.g., vehicles 1034 and 1306) to decelerate and/or abruptly stop. The autonomous vehicle 1302 has to balance these two determinations with being over conservative, thus, waiting too long at each intersection. The vehicle has to make these determinations in view of passenger comfort and maximizing traffic throughput (e.g., determining whether a human driver would perform the maneuver in a specific set of circumstances). In one implementation, when making the determination, the autonomous vehicle 1302 uses an autonomous vehicle driving model that models human behavior through an uncontrolled traffic intersection.

Figure 14:
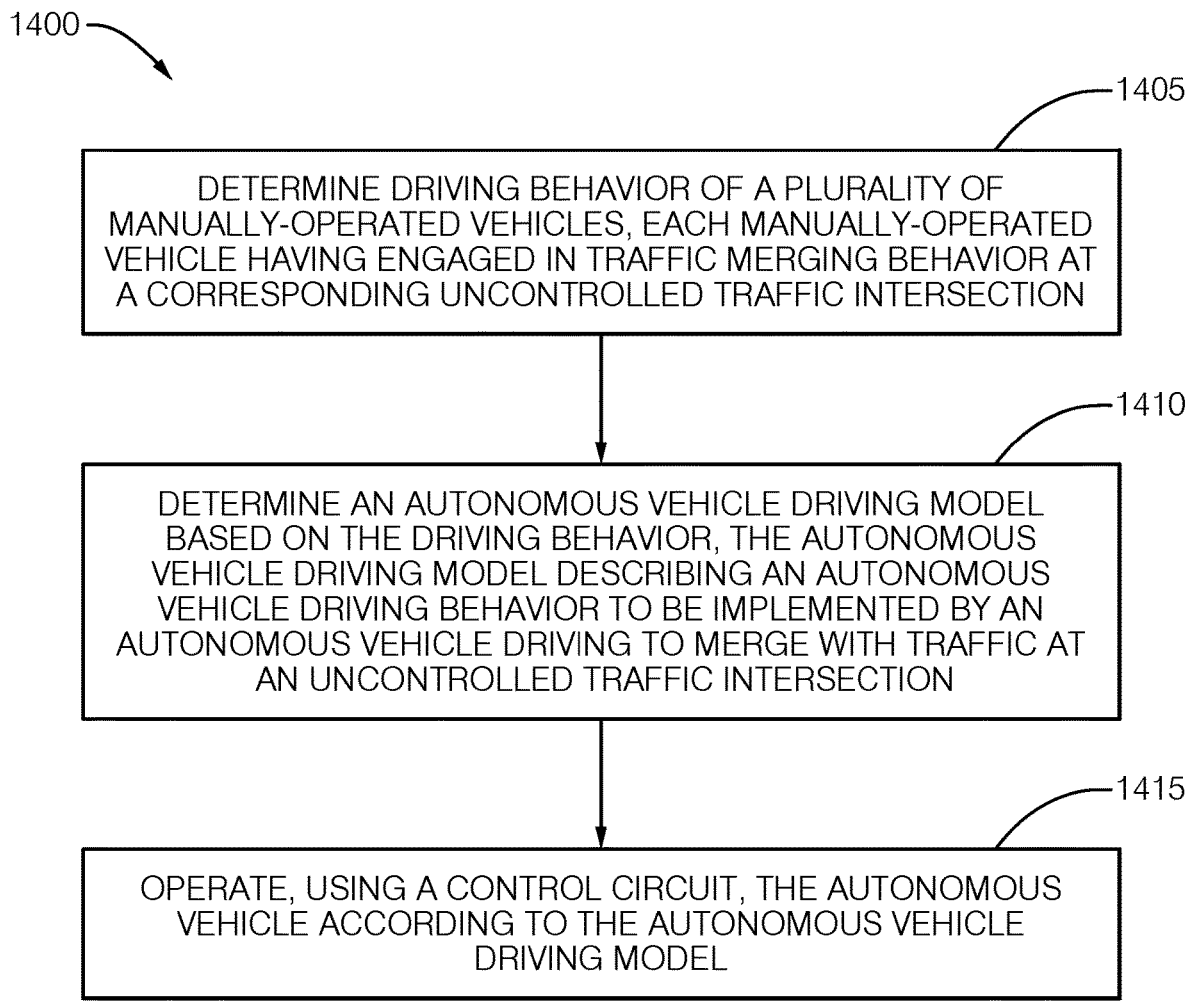
FIG. 14 illustrates actions that a computer system can take in order to generate an autonomous vehicle driving model to drive through an uncontrolled traffic intersection.

Process 1400 of FIG. 14 illustrates actions that a computer system can take in order to generate an autonomous vehicle driving model to drive through an uncontrolled traffic intersection. FIG. 14 and other figures in this disclosure are described with a reference to a computer system performing the actions. However, a person skilled in the art would understand that the actions of FIG. 14 and other figures may be performed by disclosed components (e.g., components local to the autonomous vehicle such as a processor 146, a perception module 402, a planning module 404, a control module 406 or another suitable component). Alternatively, some modules of the computer system may be located remotely from the autonomous vehicle and some actions may be performed remotely and transmitted to the autonomous vehicle while other actions may be performed at the autonomous vehicle.

In block 1405, a computer system determines driving behavior of a plurality of manually-operated vehicles (e.g., a vehicle driven by a human operator and whose driving behavior is influenced by the human operator's driving skills), each manually-operated vehicle having engaged in traffic merging behavior at a corresponding uncontrolled traffic intersection (e.g., a portion of a first traffic lane into which traffic from a second lane merges without guidance by a traffic controller, such as, a traffic light or traffic police). The driving behavior represents a driving response of a human operator who either intends to merge into an uncontrolled traffic intersection or observes another vehicle merging into the uncontrolled traffic intersection. FIG. 13 illustrates one example of an uncontrolled traffic intersection where vehicle 1302 is attempting to merge at an uncontrolled traffic intersection.

In an embodiment, the computer system, when determining the autonomous vehicle driving model, is configured to determine whether the manually-operated vehicle attempted to merge with traffic at the intersection or did not attempt to merge with traffic at the intersection. For example, the computer system may iterate through each data set of traffic merging behavior and determine whether the manually-operated vehicle has attempted to merge or did not attempt to merge. The computer system may separate the data associated with an attempt to merge from data associated with no attempt to merge. The computer system may use one or both of these data sets in generating a model, as discussed below.

In an embodiment, when determining the driving behavior the computer system identifies a vehicle that merged into a corresponding uncontrolled traffic intersection (e.g., "go" decisions), and determines (1) respective speeds of a plurality of other vehicles that were driving towards the corresponding uncontrolled traffic intersection, (2) a distance of each other vehicle of the plurality of other vehicles from the vehicle that merged and (3) a lane of each of the other vehicles. For example, the computer system may receive data collected from one or more uncontrolled traffic intersections and generate a data set from the collected data, the data set corresponding to the vehicles that merged (e.g., "go" decisions). In an embodiment, a model can be trained at an intersection level. That is, the model is saved for a specific intersection and when the autonomous vehicle approaches the specific intersection, that intersection is detected, and the model is retrieved and used for that intersection. In an embodiment, the model can be trained at a city level. That is, the model is saved for a specific city and when the autonomous vehicle is detected to be in that city, the model is retrieved and used within that city. In an embodiment, the model can be used at a jurisdictional level or a country level. That is, when the autonomous vehicle is within a specific jurisdiction or in a specific country, the model is retrieved and used. A person skilled in the art would understand that, the use or level of use of the model can depend on homogeneity in driving laws and/or driving behaviors within an area.

In block 1410, the computer system determines an autonomous vehicle driving model based on the driving behavior, the autonomous vehicle driving model describing an autonomous vehicle driving behavior (e.g., whether to merge or not to merge) to be implemented by an autonomous vehicle driving to merge with traffic at an uncontrolled traffic intersection. For example, for a given velocity and a heading of an autonomous vehicle, the model instructs the autonomous vehicle to either go, (i.e., merge into the traffic intersection) or not go (i.e., wait).

In an embodiment, the computer system analyzes data associated with the driving behavior and identifies different scenarios under which the manually-operated vehicle has merged into the intersection. That is, the computer system may analyze the distance from the intersection of each other vehicle approaching the intersection and the speed of each vehicle. Based on that information the computer system may build a model (e.g., one or more rules) for merging into the intersection. A rule may indicate that when each other vehicle traveling toward the intersection is at least certain distance away and is traveling no faster than a certain speed, the autonomous vehicle should proceed to merge into the uncontrolled traffic intersection. In an embodiment, the computer system generates one or more rules based on the speed and distance of other vehicles approaching the intersection.

In an embodiment, the computer system may take into account data on manually-operated vehicles that did not merge into the intersection. Specifically, the computer system identifies vehicles that did not merge into the corresponding uncontrolled traffic intersection (e.g., "no go" decisions). For each vehicle of the vehicles that did not merge into the corresponding uncontrolled traffic intersection, determining respective speeds of other vehicles in the vicinity of the each vehicle that were driving towards the corresponding uncontrolled traffic intersection, a distance of each other vehicle of the other vehicles from each vehicle that did not merge and a lane of each other vehicle. For example, the computer system may filter the data for instances where the manually-operated vehicle did not merge into the intersection. The computer system may analyze the speed and distance of each other vehicle traveling towards the intersection. Based on the analysis, the computer system may generate a model (or add one or more rules to a model generated in view of data for manually-operated vehicles that merged into the intersection). For example, a rule may indicate that the autonomous vehicle should not merge into the intersection if one or more vehicles are travelling towards the intersection at a speed greater than a certain speed and are closer to the intersection than a certain distance. In an embodiment, the computer system generates multiple rules (e.g., a rule for speed and a rule for distance).

In an embodiment, the computer system takes into account, when generating or adding to a model, a lane in which each approaching vehicle is located. For example, the computer system may generate a rule that indicates a combination of a speed of the approaching vehicle, a distance of the approaching vehicle from the intersection and the lane of the approaching vehicle (e.g., whether the approaching vehicle is in the lane into which the manually-operated vehicle is attempting to merge).

In an embodiment, the computer system generates a model based on both the data about the manually-operated vehicles that merged into the uncontrolled traffic intersection and did not merge into the uncontrolled traffic intersection, taking into account speed of other vehicles driving toward the intersection, distance of the other vehicles from the intersection and a lane associated with each of the other vehicles. For example, the computer system may calculate a maximum speed and maximum distances of each other vehicle when the manually-operated vehicle merged into the intersection and base a rule of a model on the maximum speed and/or maximum distance. The rule may indicate that an autonomous vehicle should merge into the intersection if a distance of each vehicle from the intersection is below the maximum distance of the approaching vehicle from the intersection and/or the speed of each of the approaching vehicle is below the maximum speed. In an embodiment, the rules of the model may include a rule, based on the collected data, that if the approaching vehicle is not in the lane into which the autonomous vehicle is attempting to merge the speed and the distance rules may be overridden.

In an embodiment, the computer system uses the collected data about manually-operated vehicles as input to a neural network in order to train the neural network as to when to merge into an uncontrolled intersection. The input may include the speed data, distance date and lane data for each approaching vehicle.

In an embodiment, the autonomous vehicle driving model maps, for a particular vehicle that was driving towards the uncontrolled traffic intersection, a speed of other vehicles that were driving towards the intersection, a distance of each other vehicle from the particular vehicle and a lane of each other vehicle. For example, the computer system may iterate through the data and store in separate data structures speeds, distances, and lanes of the approaching vehicles. The mapped data may be added to the model so that it can be processed when the autonomous vehicle is attempting to merge into an uncontrolled intersection. In an embodiment, the data may be mapped in order to prepare the data to be input into a neural network as training data.

In an embodiment, a tracking system (e.g., a sensor system that includes multiple sensors and that senses the driving of the vehicles) is positioned at an uncontrolled traffic intersection (or multiple tracking systems at multiple traffic intersections). The computer system received, from each tracking system, results of the sensing that tracks the driving behavior. The computer system may update the autonomous vehicle driving model based on received data or as data is received.

In an embodiment, the computer system generates a baseline model for the autonomous vehicle driving model. Specifically, the computer system collects data (e.g., received data associated with merging behavior of the manually-operated vehicles), identifies a data set from the collected data, and fits the data set to a baseline model. In an embodiment, the computer system generates the baseline model using one of likelihood ratio, Cox and Snell, Nagelkerke, McFadden or Tjur.

As process 1400 of FIG. 14 continues, in block 1415, the computer system uses a control circuit to operate the autonomous vehicle according to the autonomous vehicle driving model. In an embodiment, the computer system is located in the autonomous vehicle and generates driving instructions according to the autonomous vehicle driving model. Specifically, the computer system (e.g., based on sensor input) determines a distance from the autonomous vehicle to another vehicle driving towards the uncontrolled traffic intersection and a speed of the other vehicle. The computer system processes the distance and the speed according to the autonomous vehicle driving model, and provides an instruction, to the control circuit, to merge or not to merge with traffic at the uncontrolled traffic intersection based on a result of processing the distance and the speed. For example, the autonomous vehicle driving model may take as input a speed, a distance, and based on that information output a determination as to whether the autonomous vehicle should proceed to merge into the intersection or not to merge. If the output indicates that the autonomous vehicle should merge, the computer system generates one or more driving commands to the autonomous vehicle to merge into the intersection. If the output indicates that the autonomous vehicle should not merge into the intersection, the computer system starts the determination process again when the other vehicle passes the intersection.

In an embodiment, a non-transitory computer-readable storage medium is provided. The non-transitory computer-readable storage medium stores one or more programs for execution by one or more processors of a device, the one or more programs including instructions which, when executed by the one or more processors cause the device to perform the actions described above.

In an embodiment, the computer system is separate from the automated vehicle and can be located remotely from the autonomous vehicle or on the autonomous vehicle. The computer system configured to determine driving behavior of a plurality of manually-operated vehicles, each manually-operated vehicle having engaged in traffic merging behavior at corresponding uncontrolled traffic intersections. The autonomous vehicle includes one or more computer-readable media storing computer-executable instructions and one or more processors communicatively coupled to the computer system and configured to execute the computer-executable instructions.

In an embodiment, the autonomous vehicle receives the driving behavior from the computer system and determines an autonomous vehicle driving model based on the driving behavior, the autonomous vehicle driving model describing an autonomous vehicle driving behavior to be implemented by an autonomous vehicle engaged in traffic merging behavior at an uncontrolled traffic intersection. The autonomous vehicle may determine the autonomous vehicle driving model based on any method discussed above. The autonomous vehicle, then self-operates according to the autonomous vehicle driving model. In an embodiment, the computer system is separate from the vehicle and may provide the driving behavior to the vehicle. In an embodiment, the computer system is on-board the vehicle.

In an embodiment, the computer system predicts what a human operator will do in a specific set of circumstances. For example, if the autonomous vehicle is driving and detected another vehicle (e.g., a human-operated vehicle) attempting to merge into the intersection, the computer system may use the same model to determine whether the human operator will attempt the merge or wait. The computer system may drive the vehicle according to the determination. Thus, if the computer system determines, based on the model, that the vehicle will proceed with a merger, the computer system may decelerate the vehicle slightly to avoid a collision. In an embodiment, the computer system accelerates the vehicle if it determines that the other vehicle is predicted to wait until the autonomous vehicle passes the intersection. In an embodiment, the computer system may generate a different model with different rules, but based on the same data to make the determination.

Modeling Human Driving Behavior to Drive Past a Stationary Vehicle

For an autonomous vehicle, attempting to drive past a stationary vehicle in the same lane is challenging for various reasons. For example, the autonomous vehicle must, in addition to its own speed and distance to the stationary vehicle, determine whether there is enough distance and/or time to pass the stationary vehicle taking into account any vehicles in the adjacent lane(s). Those calculations must be made in real time requiring either a large amount of processing power in the autonomous vehicle or, when processing is done at a server, a fast connection to the server. Therefore, generating a model (e.g., a set of rules) for driving past a stationary vehicle enables an autonomous vehicle to use less processing power and/or network connectivity.

Figure 15:
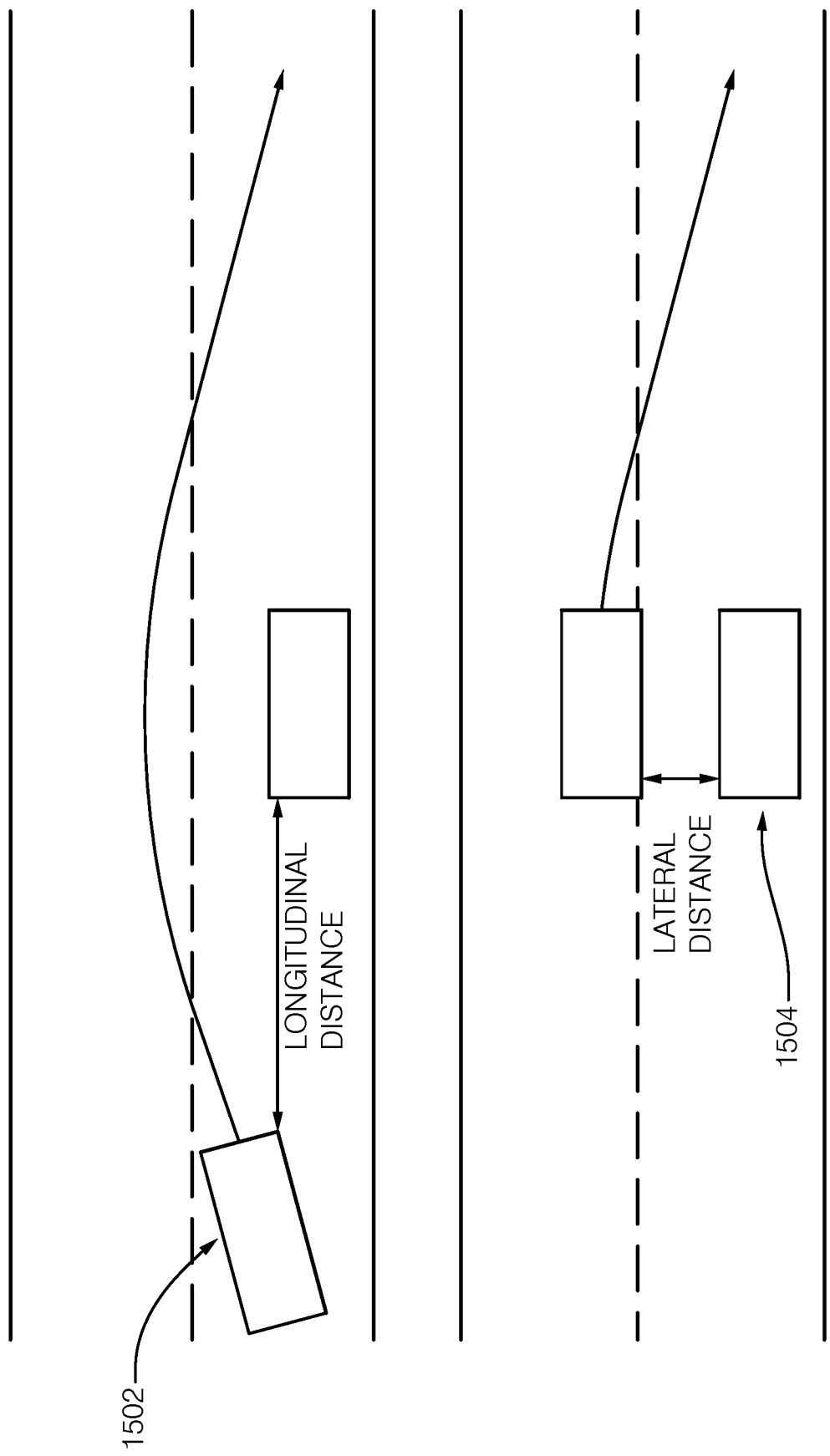
FIG. 15 illustrates an example of an autonomous vehicle attempting to past a stationary vehicle in the same lane.

FIG. 15 illustrates an example of an autonomous vehicle attempting to pass a stationary vehicle in the same lane. The autonomous vehicle 1502 is illustrated as determining that the conditions are proper for passing the stationary vehicle in the same lane. Prior to the passing maneuver, the autonomous vehicle 1502 has to perform calculations in order to determine at what point it is optimal or safe to pass the stationary vehicle 1504. Specifically, the autonomous vehicle 1502 has to determine whether passing the vehicle in an adjacent lane would cause the autonomous vehicle 1502 to crash into another vehicles that may be in the adjacent lane and whether there is enough longitudinal and lateral distance available to make the pass. In an embodiment, the autonomous vehicle 1502 has to balance this determination with being over conservative, thus, stopping too many times behind a stopped vehicle. The vehicle has to make these determinations in view of passenger comfort and maximizing driving times (e.g., determining whether a human driver would perform the maneuver in a specific set of circumstances). In one implementation, when making the determination, the autonomous vehicle 1502 uses an autonomous vehicle driving model that models human behavior while attempting to pass a stationary vehicle in the same lane.

Figure 16:
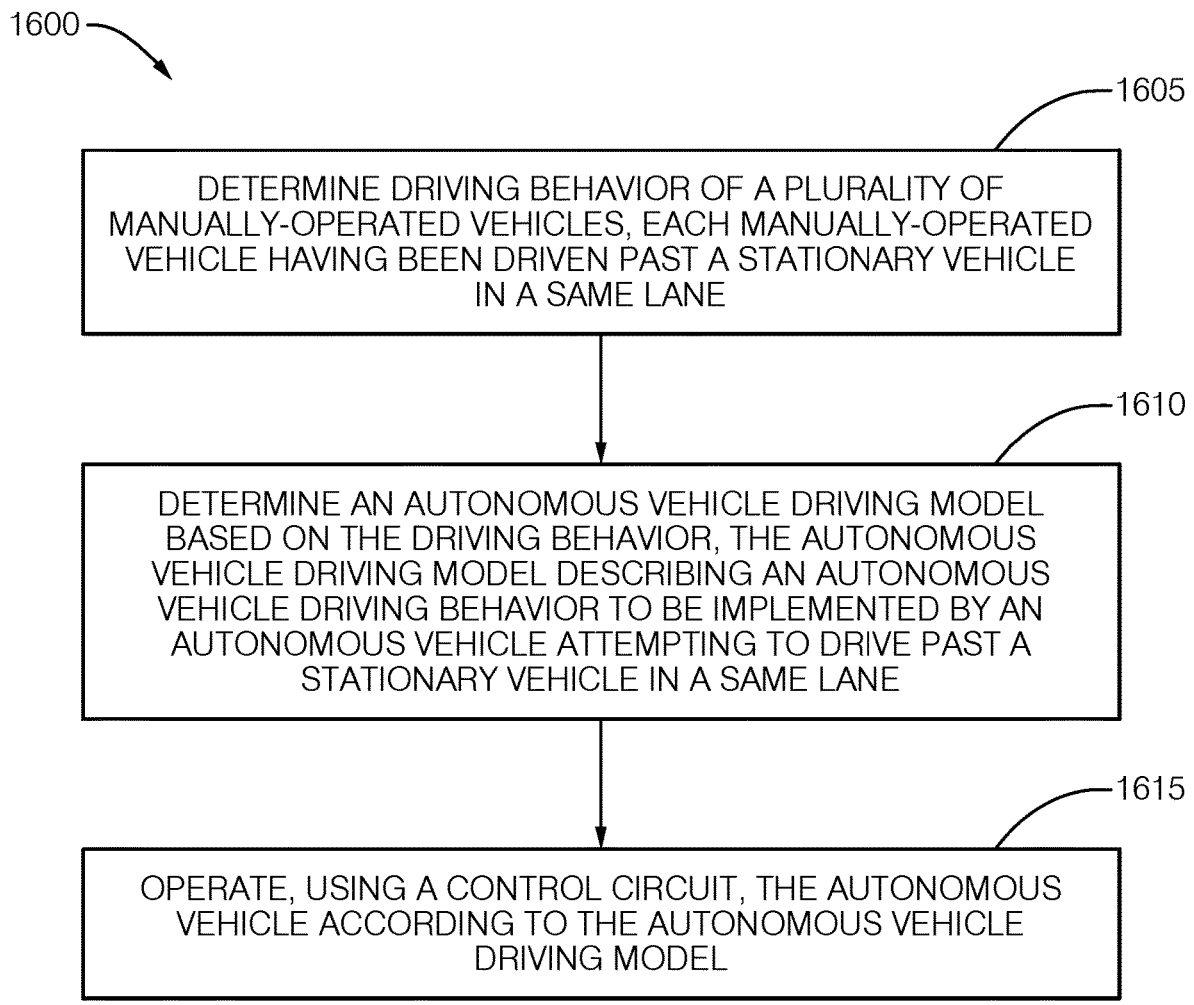
FIG. 16 illustrates actions that a computer system can take in order to generate an autonomous vehicle driving model to drive past a stationary vehicle in the same lane.

Process 1600 of FIG. 16 illustrates actions that a computer system can take in order to generate an autonomous vehicle driving model to drive past a stationary vehicle in the same lane. FIG. 16 and other figures in this disclosure are described with a reference to a computer system performing the actions. However, a person skilled in the art would understand that the actions of FIG. 16 and other figures may be performed by disclosed components (e.g., components local to the autonomous vehicle such as a processor 146, a perception module 402, a planning module 404, a control module 406 or another suitable component). Alternatively, some modules of the computer system may be located remotely from the autonomous vehicle and some actions may be performed remotely and transmitted to the autonomous vehicle while other actions may be performed at the autonomous vehicle.

In block 1605, the computer system determines driving behavior of a plurality of manually-operated vehicles (e.g., a vehicle driven by a human operator and whose driving behavior is influenced by the human operator's driving skills), each manually-operated vehicle having been driven past a stationary vehicle in the same lane (e.g., the stationary vehicle can be parked or have stalled in the same lane as the manually-operated vehicle and traffic in an adjacent lane may be headed in the same or opposite direction as the autonomous vehicle is heading). The driving behavior represents a driving response of a human operator who intends to drive past a vehicle that is (i) ahead of the human operator's vehicle, (ii) in the same lane as the human operator's vehicle and (iii) stationary.

In an embodiment, the computer system receives data describing the driving behavior of manually-operated vehicles. The data may include one or more of a velocity of the manually-operated vehicle, a heading of a manually-operated vehicle, a longitudinal distance between each manually-operated vehicle and a corresponding stationary vehicle, a lateral distance when each manually-operated vehicle was driving past the stationary vehicle, a direction of the adjacent lane and other suitable data. In an embodiment, a model can be trained at road level. That is, the model is saved for a specific road and when the autonomous vehicle is on the specific road, that road is detected, and the model is retrieved and used for that road. In an embodiment, the model can be trained at a city level. That is, the model is saved for a specific city and when the autonomous vehicle is detected to be in that city, the model is retrieved and used within that city. In an embodiment, the model can be used at a jurisdictional level or a country level. That is, when the autonomous vehicle is within a specific jurisdiction or in a specific country, the model is retrieved and used. A person skilled in the art would understand that, the use or level of use of the model can depend on homogeneity in driving laws and/or driving behaviors within an area.

In an embodiment, determining the driving behavior includes determining that each manually-operated vehicle changed lanes to drive past a corresponding stationary vehicle. For example, the computer system may analyze received data associated with the manually-operated vehicles and determine a subset of the data where the manually-operated vehicles changed lanes to drive past the stationary vehicle (e.g., instead of stopping behind the stationary vehicle). In an embodiment, the data associated with scenarios where the manually-operated vehicles did not change lanes to drive past the stationary vehicle is filtered out because it may not be useful in certain scenarios. However, in different embodiments, the data about the vehicles that did not change lanes (e.g., that stopped behind the stationary vehicle) is useful to determine at which point (e.g., at which speed and distance) the autonomous vehicle should stop instead of attempting to drive past the stationary vehicle.

In an embodiment, determining the driving behavior includes determining a longitudinal distance between each manually-operated vehicle and corresponding stationary vehicle when each manually-operated vehicle initiated a lane change to an adjacent lane. For example, FIG. 15 illustrates one example of a longitudinal distance. Determining longitudinal distance of each manually-operated vehicle enables the system to evaluate at what distance human drivers started a lane change and emulate that behavior via the autonomous driving vehicle model. For example, the computer system may analyze the longitudinal distances for each manually-operated vehicle, and generate a model (e.g., one or more rules) for changing lanes based on distance from the stationary vehicle. The computer system may, based on the distance, calculate one or more of the mean, median, and mode distances and base one or more rules on those distances. For example, a rule may indicate that the autonomous vehicle should start a lane change at a specific distance from the stationary vehicle, where the specific distance may be mean, mode, or median distance calculated from the data associated with the driving behavior.

In an embodiment, determining the driving behavior includes determining a speed of each manually-operated vehicle when initiating the lane change. For example, the computer system may analyze a speed corresponding to each manually-operated vehicle and determine one or more of mean, mode, and median speeds at which the manually-operated vehicles started a lane change to drive past the stationary vehicle. The computer system may generate or add to a model rules based on speed. For example, a rule may indicate that if the speed of the autonomous vehicle is greater than one of the mode, mean or median speed, the control circuitry should decelerate the autonomous vehicle to a lower speed.

In an embodiment, determining the driving behavior includes determining a lateral distance between each stationary vehicle and a corresponding manually-operated vehicle in the adjacent lane when each manually-operated vehicle drove past the stationary vehicle. For example, the computer system may analyze how close to the corresponding stationary vehicle each manually-operated vehicle was when passing the stationary vehicle. The computer system may determine one or more of mean, median, and mode lateral distances for each instance of a manually-operated vehicle passing a corresponding stationary vehicle. The computer system may generate and/or update an autonomous vehicle driving model based on the information. That is, the computer system may create a rule that indicates that the autonomous vehicle should maneuver in a way that enables the autonomous vehicle to pass the stationary vehicle at a lateral distance that is no smaller than one of the determined distances.

In an embodiment, determining the driving behavior includes determining a direction of traffic in a lane adjacent to a lane of each manually-operated vehicle. The data on direction of the traffic in an adjacent lane may indicate whether human drivers take into account traffic direction when performing a specific maneuver. For example, if changes characteristics of each specific maneuver (e.g., speed, starting distance, whether maneuver is performed or a vehicle is stopped, and/or another suitable characteristic) are within a threshold when performing the maneuver in places where there is an adjacent lane with traffic in the same direction and in other places where there is an adjacent lane with traffic in a different direction, the computer system determines that lane direction does not affect the maneuver. However, if changes characteristics meet the threshold or are above the threshold, the computer system determines that lane direction affects the maneuver. For example, the computer system, may analyze each lane changing maneuver of the manually-operated vehicle when driving past a stationary vehicle, and determine whether each manually-operated vehicle changed lanes into a lane of the same direction or a lane of a different direction. For example, if the computer system determines that in many or most cases, the manually-operated vehicle changed lanes into a lane of the same direction, the computer system generates or updates a model to change lanes into a lane of the same direction. However, if the adjacent lane is not in the same direction as the lane of the manually-operated vehicle, the computer system may analyze what actions were taken by the driver of the manually-operated vehicle and add those actions to the model (e.g., the driver stopped and waited)

To continue with process 1600 of FIG. 16, in block 1610, the computer system determines an autonomous vehicle driving model based on the driving behavior, the autonomous vehicle driving model describing an autonomous vehicle driving behavior to be implemented by an autonomous vehicle attempting to drive past a stationary vehicle in a same lane. For example, the computer system may analyze each instance of a manually-operated vehicle and determine smallest distance between the manually-operated vehicle and the stationary vehicle (longitudinal distance) at which the manually-operated vehicle started the passing maneuver. The computer system may generate a part of the model (e.g., a rule) based on that information. The rule may indicate that if the autonomous vehicle is at least a minimum longitudinal distance away from the stationary vehicle, the autonomous vehicle may start the passing maneuver.

In another example, the computer system may analyze each instance of a manually-operated vehicle and determine smallest distance between the manually-operated vehicle and the stationary vehicle (lateral distance) as the manually-operated vehicle was the passing the stationary vehicle. Based on that distance, the computer system may generate a rule (e.g., to include in the autonomous vehicle driving model). For example, the rule may indicate that the autonomous vehicle has to continue to change into another lane until a minimum lateral distance is reached. When the minimum lateral distance will be reached (based on a degree of turn) the autonomous vehicle should adjust its heading to complete the lane change.

In an embodiment, the autonomous vehicle driving model is configured to determine when the autonomous vehicle should initiate a lane change to pass the stationary vehicle based on the driving behavior. For example, based on the driving behavior, the computer system may generate a model (e.g., including one or more rules) for passing a stationary vehicle in the same lane. As discussed above, the computer system may determine, from the driving behavior data, one or more of mean, mode, median, maximum, and minimum longitudinal distances at which manually-operated vehicles started passing maneuvers to pass a stationary vehicle. The computer system may generate one or more rules based on that information. For example, a rule may indicate that the autonomous vehicle can start a passing maneuver when it is at least a certain longitudinal distance from the stationary vehicle. That longitudinal distance may be mean, mode, median, maximum, minimum, or another suitable longitudinal distance.

In an embodiment, the computer system takes into account, when generating the autonomous vehicle drive model, the speed of each manually-operated vehicle. For example, the computer system may determine, based on the driving behavior, one or more of mean, mode (e.g., when rounding off speeds), median, maximum, and minimum. Based on one or more of the values that computer system may generate a rule that indicates that the autonomous vehicle should speed up/slow down before passing the stationary vehicle to achieve the determined speed. In an embodiment, the computer system generates a rule based on the combination of speed and longitudinal distance. For example, the computer system may analyze the driving behavior of manually-operated vehicle and determine, for each manually-operated vehicle a speed at which the manually-operated vehicle was moving and the longitudinal distance at which the passing maneuver was started. Thus, based on the pairs of speeds and longitudinal distances, the computer system may generate a rule that indicates that if the autonomous vehicle is moving at a certain speed, the passing maneuver should be started at a specific distance (or before a specific distance is reached).

Additionally or alternatively, the computer system may generate a rule (for the autonomous vehicle driving model), that indicates that if the autonomous vehicle is too close to the stationary vehicle so that, based on the speed of the autonomous vehicle, more distance is needed to perform the passing maneuver, the autonomous vehicle should be slowed down so that the passing maneuver can take place within the parameters of the driving behavior.

In an embodiment, the computer system generates/updates an autonomous vehicle driving model taking into account a direction of a lane that the manually-operated vehicle has change lanes into (e.g., an adjacent lane). For example, the computer system may generate a rule for the model that indicates that if the adjacent lane is in a different direction than the lane of the autonomous vehicle, the autonomous vehicle should change lanes (start the passing maneuver) at a minimum longitudinal distance (and in some instances with an increased speed so as to spend as little time as possible in the adjacent lane) and then when the autonomous vehicle passes the stationary vehicle, the autonomous vehicle should change lanes back promptly. In another example, if the adjacent lane is in the same direction as the lane where the autonomous vehicle is driving, the computer system, may generate a rule that indicates that the autonomous vehicle should change lanes some time/distance prior to reaching the minimum distance.

To continue with process 1600 of FIG. 16, in block 1615, the computer system operates, using a control circuit, the autonomous vehicle according to the autonomous vehicle driving model. As discussed above, the computer system may be located at the autonomous vehicle or remotely from the autonomous vehicle. In instances, where the computer system is located at the autonomous vehicle, the computer system can direct other vehicle systems to drive according to the autonomous vehicle driving model. For instances, where the computer system is located remotely from the autonomous vehicle, the computer system may send the commands to the vehicle (e.g., through a wireless network).

In an embodiment, the computer system predicts what a human operator will do in a specific set of circumstances. For example, if the autonomous vehicle has to stop in a lane (e.g., because a passenger needs to leave the vehicle), the system may use the same model to determine whether a vehicle driving behind has enough distance (e.g., given its speed and distance from the stopping vehicle) to drive past or stop. In an embodiment, the computer system may generate a different model with different rules, but based on the same data to make the determination.

In an embodiment, the computer system operates the autonomous vehicle according to the autonomous vehicle driving model by performing the following actions. The computer system determines a speed of the autonomous vehicle, a heading of the autonomous vehicle, and a direction of traffic in the adjacent lane. For example, the computer system, may receive that information from one or more sensors (as described above) located at the vehicle (e.g., cameras, RADAR, LiDAR, and/or other suitable sensors. Using the autonomous vehicle driving model, the computer system determines a longitudinal distance and a lateral distance for passing a stationary vehicle in the same lane. For example, the computer system may access the autonomous vehicle driving model and retrieve one or more rules associated with the model. The rules may include thresholds for one or more of longitudinal distance, lateral distance, and lane direction. The computer system may apply the sensor data to the rule and, based on the application, provide an instruction to the autonomous vehicle to initiate a lane change at least when a distance between the autonomous vehicle and the stationary vehicle is greater than the longitudinal distance, and pass the stationary vehicle with at least the lateral distance.

In an embodiment, the autonomous vehicle applies the model to a situation where the autonomous vehicle attempts to pass a moving vehicle in front where an adjacent lane has traffic moving in the opposite direction (e.g., on a two-lane road with the two lanes having traffic in opposite directions). In this situation, the autonomous vehicle has to determine whether to proceed with the passing maneuver or wait for a better opportunity (e.g., while driving behind the vehicle in front). In this and other embodiments, the autonomous vehicle uses the data representing human operator decisions to determine whether to proceed with merging into an adjacent lane with traffic flowing in a different direction. The determination is based on, for example, the speed of the vehicle in front, the speed and/or distance of any oncoming vehicles in the adjacent lane, and traffic laws (e.g., whether passing is allowed, the speed limit, and/or another suitable traffic law).

In an embodiment, the computer system receives data from a tracking system (e.g., a sensor system that senses the driving behavior of manually-operated vehicles and transmits the driving behavior to the computer system which may or may not be at the same location as the tracking system) positioned at or near stationary vehicles to track the driving behavior. For example, a stationary vehicle may include sensors that track each vehicle that is attempting to drive past and record the other vehicle's speed, longitudinal distance when the vehicle starts the passing maneuver, lateral distance when the maneuver is executed, and other suitable data.

In an embodiment, a computer system that collects and processing driving behavior data may be separate from the vehicle. For example, the computer system may be a module that can be added to the vehicle or it can be located remotely from the vehicle. The computer system is configured to determine driving behavior (e.g., driving behavior represents a driving response of a human operator who intends to drive past a vehicle that is (i) ahead of the human operator's vehicle, (ii) in the same lane as the human operator's vehicle and (iii) stationary) of a plurality of manually-operated vehicles (e.g., a manually-operated vehicle is a vehicle driven by a human operator and whose driving behavior is influenced by the human operator's driving skills), each manually-operated vehicle having been driven past a stationary vehicle in a same lane (e.g., the stationary vehicle can be parked or have stalled in the same lane as the manually-operated vehicle; traffic in an adjacent lane may be headed in the same or opposite direction as the AV).

The, autonomous vehicle, in this instance includes one or more computer-readable media storing computer-executable instructions (e.g., a storage device that includes one or more hard drives, flash drivers) and one or more processors communicatively coupled to the computer system and configured to execute the computer-executable instructions, the execution carrying out operations comprising. The autonomous vehicle receives, by the vehicle, the driving behavior from the computer system. For example, the autonomous vehicle may receive processed data based on the collected driving behavior. The autonomous vehicle may receive longitudinal distances, speeds, lateral distances, lane directions, and other suitable information.

The autonomous vehicle determines/generates an autonomous vehicle driving model (e.g., for a given velocity and a heading of an autonomous vehicle, the model instructs the autonomous vehicle to drive past the stationary vehicle) based on the tracked driving behavior, the autonomous vehicle driving model describing an autonomous vehicle driving behavior (e.g., a velocity and a heading of the autonomous vehicle) to be implemented by an autonomous vehicle driving to drive past a stationary vehicle in a same lane on which the autonomous vehicle is driving. In this instance, the autonomous vehicle may generate the model using actions described above (e.g., generating rules that use the received data). The autonomous vehicle then self-operates according to the autonomous vehicle driving model.

As discussed above, the computer system may be located at the autonomous vehicle or can be separate from the autonomous vehicle (e.g., located away from the autonomous vehicle. the computer system is separate from the vehicle. The computer system, in these instances may analyze collected data and provide the driving behavior to the autonomous vehicle, which in turn may generate the autonomous vehicle driving model. In an embodiment, the autonomous vehicle generates the autonomous vehicle driving model taking into account maneuvering/driving limitations/characteristics of the specific autonomous vehicle. For example, the amount of time it takes the vehicle to slow down when breaks are applied, the weight of the autonomous vehicle, sensitivity of sensors (e.g., at what distance a stationary vehicle can be detected), and other suitable limitations/characteristics of the autonomous vehicle.

In an embodiment, a non-transitory computer-readable storage medium is provided. The non-transitory computer-readable storage medium stores one or more programs for execution by one or more processors of a device, the one or more programs including instructions which, when executed by the one or more processors cause the device to perform the actions described above.

Modeling Human Driving Behavior to Avoid a Jaywalker

For an autonomous vehicle, attempting to avoid a jaywalker in the road (whether in the same lane or in one of the lanes near the autonomous vehicle is challenging for various reasons. For example, the autonomous vehicle must, in addition to its own speed and location, determine whether there is enough distance and/or time (given its speed) to avoid the jaywalker before or after the jaywalker is in the lane of the autonomous vehicle, or whether the autonomous vehicle should change into an adjacent lane (if one is available). The autonomous vehicle must also take into account any vehicles in the adjacent lane(s). Those calculations must be made in real time requiring either a large amount of processing power in the autonomous vehicle or, when processing is done at a server, a fast connection to the server. In addition, the autonomous vehicle has to determine whether merging into the intersection 1300 would cause the vehicles in the adjacent lanes to decelerate and/or abruptly stop. The autonomous vehicle has to balance these determinations with being over conservative, thus, waiting too long for a jaywalker to leave the lane. The vehicle has to make these determinations in view of passenger comfort and maximizing traffic throughput (e.g., determining whether a human driver would perform the maneuver in a specific set of circumstances). Therefore, generating a model (e.g., a set of rules) for driving in a present of a jaywalker enables an autonomous vehicle to use less processing power and/or network connectivity.

Figure 17:
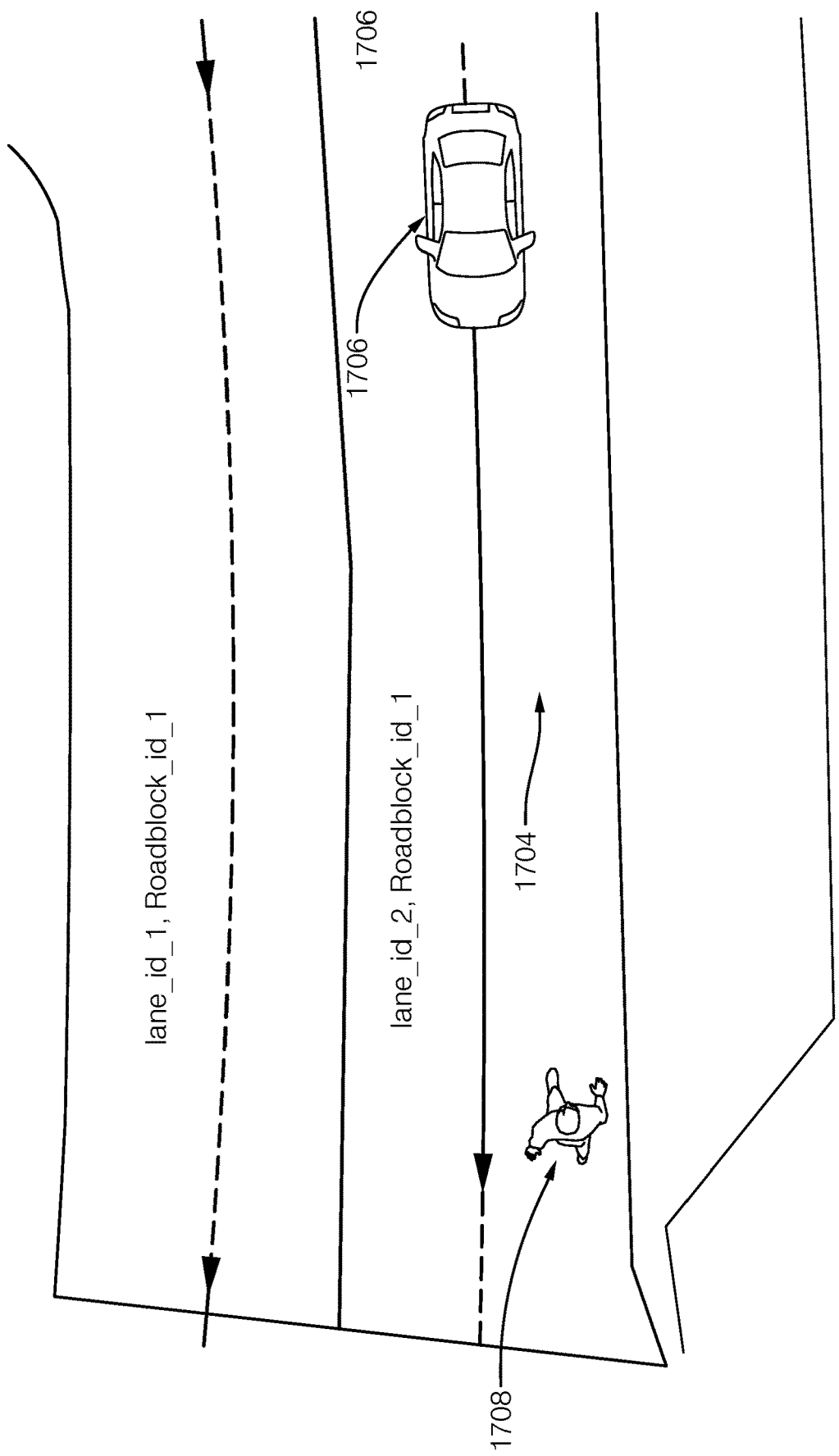
FIG. 17 illustrates a scenario for avoiding a jaywalker when the autonomous vehicle is driving on a road with two lanes with an adjacent lane having traffic in the same direction.
Figure 18:
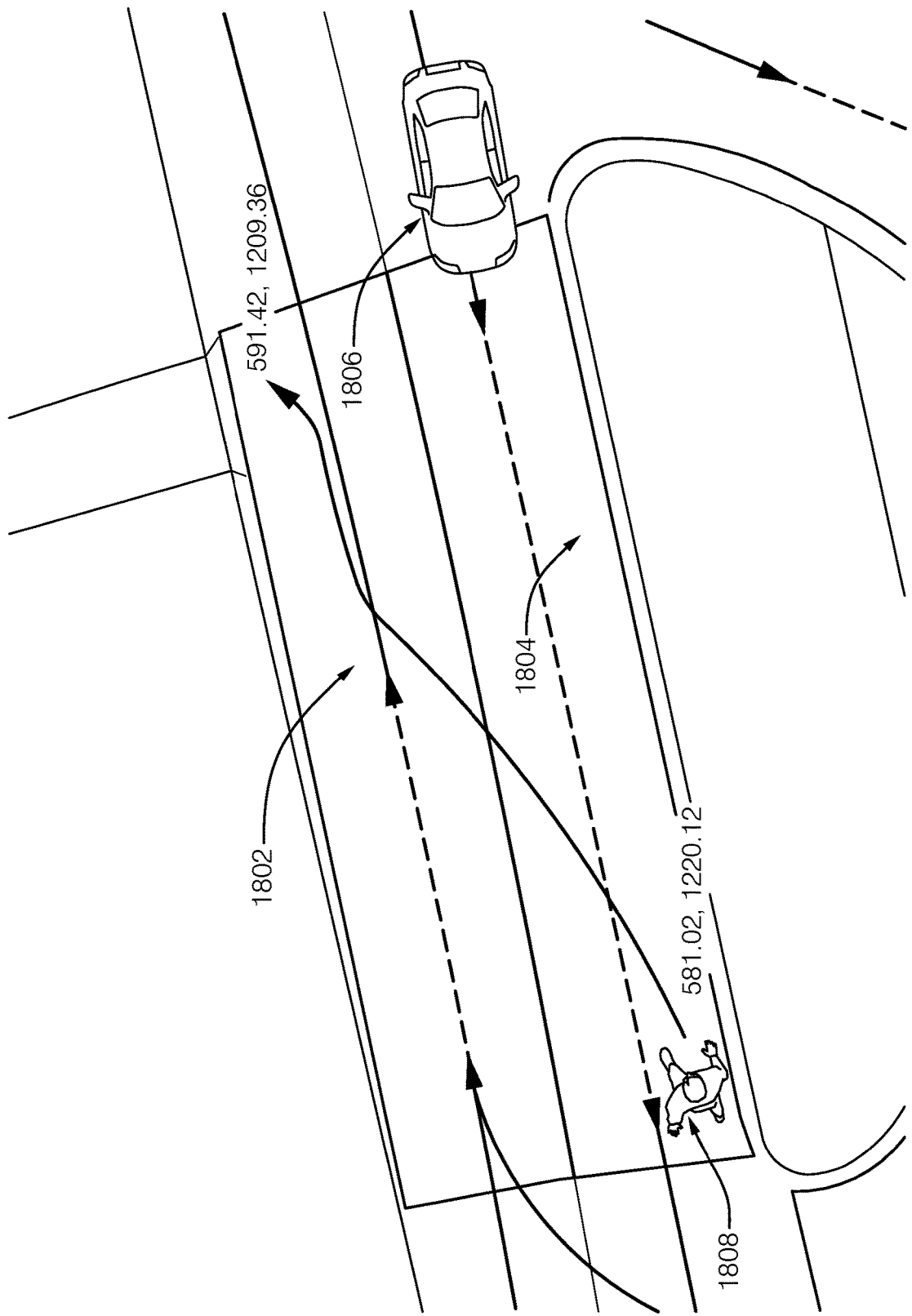
FIG. 18 illustrates a scenario for avoiding a jaywalker when the autonomous vehicle is driving on a road with two lanes with an adjacent lane having traffic in an opposite direction.
Figure 19:
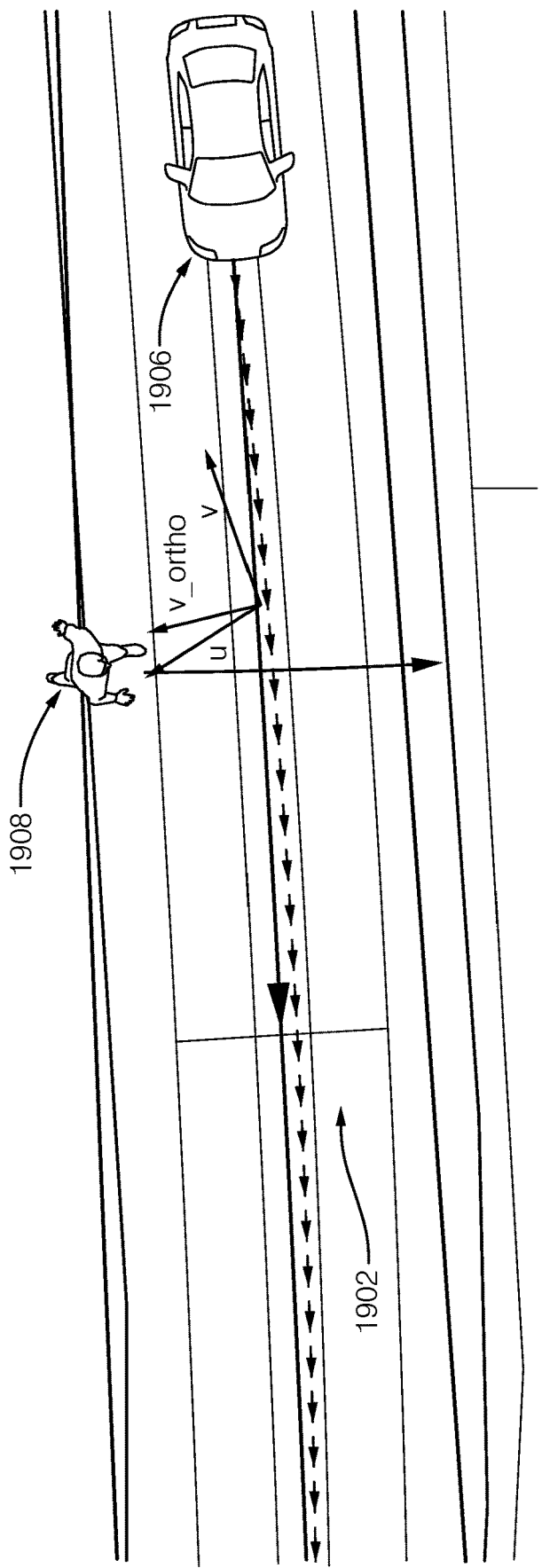
FIG. 19 illustrates a scenario for avoiding a jaywalker when the autonomous vehicle is driving on a road with a single lane.

FIGS. 17-19 illustrate examples of various scenarios related to avoiding a jaywalker. FIG. 17 illustrates a scenario for avoiding a jaywalker when the autonomous vehicle is driving on a road with two lanes with an adjacent lane having traffic in the same direction. The data on direction of the traffic in an adjacent lane may indicate whether human drivers take into account traffic direction when performing a specific maneuver. For example, if changes characteristics of each specific maneuver (e.g., speed, starting distance, whether maneuver is performed or a vehicle is stopped, and/or another suitable characteristic) are within a threshold when performing the maneuver in places where there is an adjacent lane with traffic in the same direction and in other places where there is an adjacent lane with traffic in a different direction, the computer system determines that lane direction does not affect the maneuver. However, if changes characteristics meet the threshold or are above the threshold, the computer system determines that lane direction affects the maneuver. Specifically, FIG. 17 illustrates a road having two lanes (lane 1702 and lane 1704) that allow traffic in the same direction. An autonomous vehicle 1706 is traveling in a lane 1704. There is also a jaywalker 1708 in the same lane (lane 1704) as the vehicle. In this scenario, the autonomous vehicle has to determine how to avoid the jaywalker. For example, the autonomous vehicle has to determine whether to change lanes, slow down, stop, do nothing, perform a different maneuver, or perform a combination of maneuvers. When making the determination the autonomous vehicle may have to take into account factors like its own speed, traffic in the adjacent lane, velocity of the jaywalker (both speed and direction), and other suitable factors.

FIG. 18 illustrates a scenario for avoiding a jaywalker when the autonomous vehicle is driving on a road with two lanes with an adjacent lane having traffic in an opposite direction. Specifically, FIG. 18 illustrates a road having two lanes (lane 1802 and lane 1804) that allow traffic in different directions. An autonomous vehicle 1806 is traveling in a lane 1804. There is also a jaywalker 1808 in the same lane (lane 1804) as the vehicle. In this scenario, the autonomous vehicle has to determine how to avoid the jaywalker (1808). For example, the autonomous vehicle has to determine whether to change lanes (which could be illegal at that location), slow down, stop, do nothing, perform a different maneuver, or perform a combination of maneuvers. When making the determination the autonomous vehicle may have to take into account factors like its own speed, traffic in the adjacent lane, velocity of the jaywalker (both speed and direction), traffic rules, and other suitable factors. In an embodiment, a model can be trained at road level. That is, the model is saved for a specific road and when the autonomous vehicle approaches the specific road, that road is detected, and the model is retrieved and used for that road. In an embodiment, the model can be trained at a city level. That is, the model is saved for a specific city and when the autonomous vehicle is detected to be in that city, the model is retrieved and used within that city. In an embodiment, the model can be used at a jurisdictional level or a country level. That is, when the autonomous vehicle is within a specific jurisdiction or in a specific country, the model is retrieved and used. A person skilled in the art would understand that, the use or level of use of the model can depend on homogeneity in driving laws and/or driving behaviors within an area.

FIG. 19 illustrates a scenario for avoiding a jaywalker when the autonomous vehicle is driving on a road with a single lane. Specifically, FIG. 19 illustrates a road having one lane (lane 1902) in which the autonomous vehicle 1906 is travelling. There is also a jaywalker 1908 in the same lane (lane 1902) as the vehicle. In this scenario, the autonomous vehicle has to determine how to avoid the jaywalker (1908). For example, the autonomous vehicle has to determine whether to pull over (if there is a road shoulder), slow down, stop, do nothing, perform a different maneuver, or perform a combination of maneuvers. When making the determination the autonomous vehicle may have to take into account factors like its own speed, existence of a road shoulder, velocity of the jaywalker (both speed and direction), traffic rules, and other suitable factors. As referred herein the term "road shoulder" refers to an area of ground at the side of a road, where cars can stop, if they need to.

Figure 20:
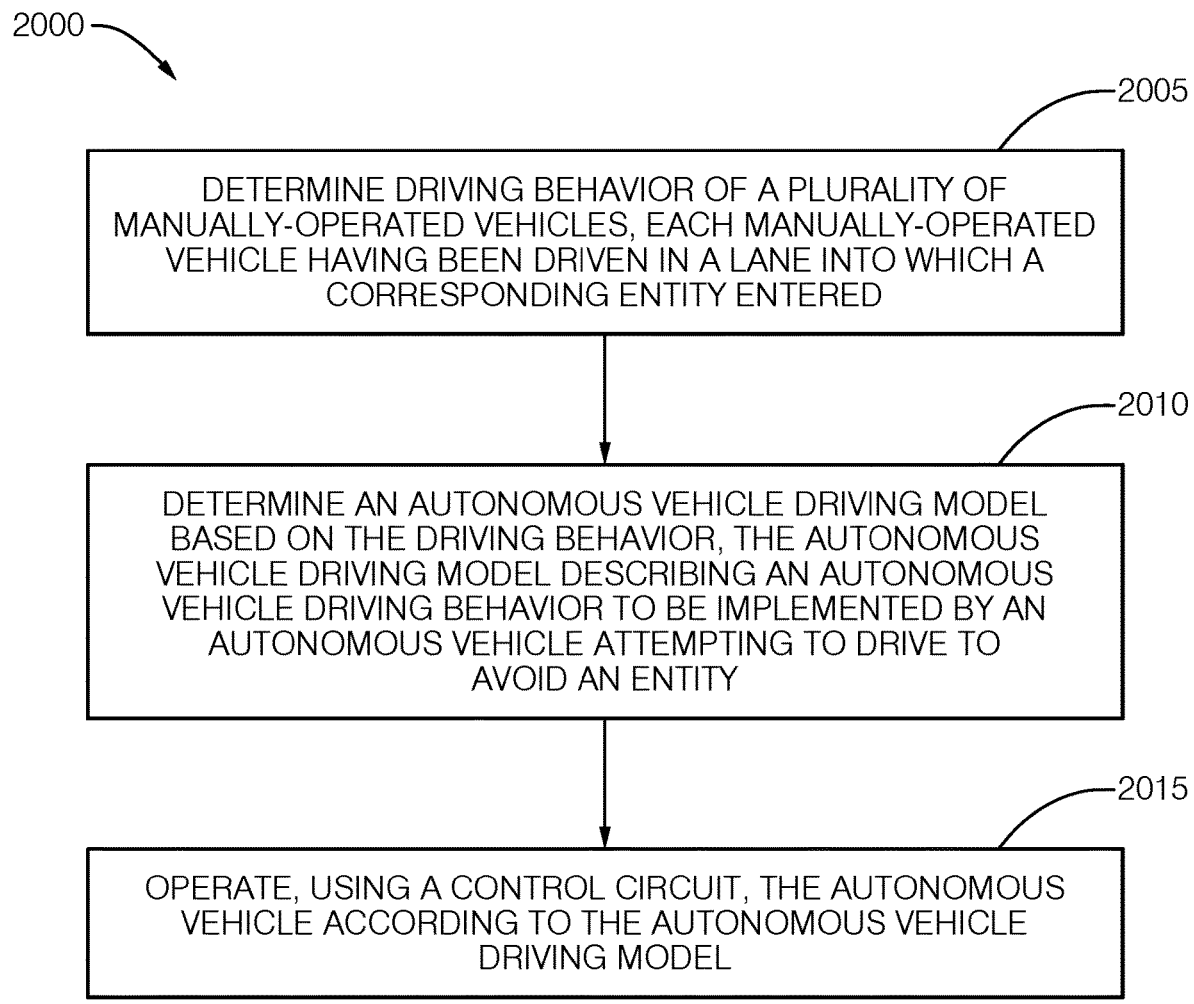
FIG. 20 illustrates actions that a computer system can take in order to generate an autonomous vehicle driving model to avoid an entity (e.g., a jaywalker, an animal a bicyclist, or another suitable entity.

Process 2000 of FIG. 20 illustrates actions that a computer system can take in order to generate an autonomous vehicle driving model to avoid an entity (e.g., a jaywalker, an animal a bicyclist, or another suitable entity). FIG. 20 and other figures in this disclosure are described with a reference to a computer system performing the actions. However, a person skilled in the art would understand that the actions of FIG. 20 and other figures may be performed by disclosed components (e.g., components local to the autonomous vehicle such as a processor 146, a perception module 402, a planning module 404, a control module 406 or another suitable component). Alternatively, some modules of the computer system may be located remotely from the autonomous vehicle and some actions may be performed remotely and transmitted to the autonomous vehicle while other actions may be performed at the autonomous vehicle.

In block 2005, the computer system determines driving behavior of a plurality of manually-operated vehicles (e.g., a manually-operated vehicle is a vehicle driven by a human operator and whose driving behavior is influenced by the human operator's driving skills), each manually-operated vehicle having been driven in a lane into which a corresponding entity entered. For example, driving behavior represents a driving response of a human operator who observes a jaywalker enter a driving lane of the human operator's vehicle. A jaywalker may be a person, an animal, a bicyclist, or another suitable entity.

In an embodiment, determining the driving behavior includes determining a number of lanes that make up the lane in which each manually-operated vehicle has been driven. For example, the computer system may determine, for each manually-operated vehicle a number of lanes in a road on which the manually-operated vehicle was driving. FIGS. 17-19 show examples of roads with one lane and two lanes, however, a person skilled in the art would understand that other scenarios with more lanes are contemplated by this disclosure. This information is important because it may inform the vehicle, through the autonomous vehicle driving model, which maneuvers can be attempted and which cannot (e.g., change to an adjacent lane, if one is available).

In an embodiment, the computer system determines a direction of traffic in each lane of the road on which each manually-operated vehicle was driven. For example, FIG. 17 illustrates two lanes that have traffic in the same direction, potentially enabling the vehicle to change into an adjacent lane. FIG. 18 illustrates two lanes that have traffic in different direction, potentially removing a change of lane maneuver from the options that the autonomous vehicle may have.

In an embodiment, the computer system, when determining the driving behavior, determines a number of lanes crossed by the corresponding entity prior to entering the lane in which each manually-operated vehicle was driven. For example, if the entity has crossed one or two lanes in a specific direction, it may have given a clue to a human driver that the entity is not going to go back into those lanes. This scenario may have led to the operator of the manually-operated vehicle to merge into an adjacent lane that the entity has already crossed. The computer system may generate/update an autonomous vehicle driving model based on this information. For example, the computer system may add a rule, to the model, based on that information, the rule indicating that if an entity crossed a certain lane before entering the lane where the autonomous vehicle is driving, the autonomous vehicle should merge into the lane that the entity crossed.

In an embodiment, the computer system, when determining the driving behavior, determines an angle at which the corresponding entity crossed the number of lanes prior to entering the lane in which each manually-operated vehicle was driven. For example, information about the angle of the crossing may have informed the human driver of the trajectory of the entity, thereby enabling avoiding the entity with a maneuver that avoids the entity's trajectory. Based on that information, the computer system may generate a rule for the model. The rule may require calculating the entity's trajectory based on the angle (and the speed of the entity). The rule may indicate that, based on the trajectory of the entity the autonomous vehicle should change lanes, if possible, into a lane that is located into an opposite direction of the entity's trajectory.

In an embodiment, the computer system, when determining the driving behavior, determines that the corresponding entity crossed the lane at a designated crossing location (e.g., the designed crossing location is a crosswalk or a zebra crossing or a construction zone). For example, if the crossing location of the entity is a designed crossing location, the computer system may generate a rule for the model to stop. The rule may take into account traffic rules of the location (e.g., that a person is allowed to cross at a designated crossing location at any time).

In an embodiment, the computer system, when determining the driving behavior, determines that the corresponding entity was following a trajectory that includes the designated crossing location and a portion of the lane in which each manually-operated vehicle was driven, and excludes the designated crossing location. For example, if a pedestrian was crossing at a designated crossing location, that pedestrian may not be a jaywalker and thus this scenario may not apply. Therefore, the computer system may remove that data from a model building process. In an embodiment, the computer system expands a region occupied by the designated crossing location. That is, the computer system may generate a buffer zone for the data as to the determination that the pedestrian is not a jaywalker. For example, when the region is a construction zone, the jaywalker is given a buffer zone surrounding the construction zone to walk.

In an embodiment, the computer system, when determining the driving behavior, determines at least one of a distance between the corresponding entity and each manually-operated vehicle, a speed of each manually-operated vehicle, a speed of the corresponding entity and a heading of the corresponding entity. For example, the computer system may analyze the speeds of manually-operated vehicles, the speeds and directions of the entities and determine which maneuver(s) the human drivers performed to avoid the entity. For example, based on the driving behavior, the computer system may generate a rule that indicates that if the autonomous vehicle is traveling at a certain speed and is located at a certain distance from the entity, the autonomous vehicle should change lanes into an adjacent lane or slow down (e.g., slow enough so the jaywalker move out of the lane), stop, or perform a combination of maneuvers.

To continue with FIG. 20, in block 2010, the computer system determines an autonomous vehicle driving model based on the driving behavior, the autonomous vehicle driving model describing an autonomous vehicle driving behavior (e.g., a velocity and a heading of the autonomous vehicle) to be implemented by an autonomous vehicle attempting to drive to avoid an entity. For example, the model may include a rule that indicates for a given velocity and a heading of an autonomous vehicle relative to the entity, a maneuver to be performed by the autonomous vehicle to avoid the entity.

In an embodiment, the computer system, when determining the autonomous vehicle driving model determines, for each determined speed and heading of each manually-operated vehicle, a minimum distance between each manually-operated vehicle and the corresponding entity to allow the corresponding entity to cross the lane without modifying vehicle behavior. For example, the model may include a rule that if the autonomous vehicle is at least a certain distance away (based on the driving behavior) and is not moving faster than a certain speed (based on the driving behavior), the autonomous vehicle should take no action (e.g., because the entity will be out of the vehicle's lane when the vehicle is driving in a location where the entity is present at a current time.

In an embodiment, the computer system, when generating the autonomous vehicle driving model is configured to determine when the autonomous vehicle should initiate a lane change to avoid the entity based on the autonomous vehicle driving behavior. For example, the computer system may generate a rule that indicates that if an adjacent lane is available and the entity, based on its trajectory, is not expected to be in the adjacent lane when the autonomous vehicle is even with the entity, the autonomous vehicle should change lanes to the adjacent lane.

To continue with process 2000 of FIG. 20, in block 2015, the computer system operates, using a control circuit, the autonomous vehicle according to the autonomous vehicle driving model. As discussed above, the computer system may be located at the autonomous vehicle or remotely from the autonomous vehicle. In instances, where the computer system is located at the autonomous vehicle, the computer system can direct other vehicle systems to drive according to the autonomous vehicle driving model. For instances, where the computer system is located remotely from the autonomous vehicle, the computer system may send the commands to the vehicle (e.g., through a wireless network)

In an embodiment, the computer system operates the autonomous vehicle according to the autonomous vehicle driving model by taking the following actions. The computer system determines a speed and a heading of the autonomous vehicle and a speed and a heading of the entity. Using the autonomous vehicle driving model, the computer system determines a minimum distance between the autonomous vehicle and the entity for the speed and the heading of the autonomous vehicle and the speed and the heading of the entity. The computer system provides an instruction to the autonomous vehicle to modify driving behavior of the autonomous vehicle. (e.g., slow down or initiating a change to a lane that the entity has crossed to avoid the entity).

In an embodiment, a computer system and a vehicle may be part of an autonomous driving system. The computer system may be a separate system (e.g., a module) that can be built into the vehicle or be located remotely from the vehicle. In both instances, the computer system is configured to track driving behavior (e.g., driving behavior represents a driving response of a human operator who intends to avoid a pedestrian in the same lane) of a plurality of manually-operated vehicles (e.g., a manually-operated vehicle is a vehicle driven by a human operator and whose driving behavior is influenced by the human operator's driving skills). Specifically, each manually-operated vehicle having been driven in a lane into which a corresponding entity entered (e.g., entity can be a pedestrian or an animal).

The vehicle includes (e.g., on board) one or more computer-readable media storing computer-executable instructions and one or more processors communicatively coupled to the computer system and configured to execute the computer-executable instructions, the execution carrying out the following operations. Receiving, by the vehicle, the driving behavior from the computer system, and determining, by the computer system, an autonomous vehicle driving model (e.g., for a given velocity and a heading of an autonomous vehicle, whether to change lanes or stop) based on the driving behavior. As described above, the autonomous vehicle driving model describes an autonomous vehicle driving behavior (e.g., a velocity and a heading of the autonomous vehicle) to be implemented by an autonomous vehicle driving to avoid the entity. The autonomous vehicle may then self-operate according to the autonomous vehicle driving model.

In one example, the computer system resides at a remote location (e.g., in a datacenter remove from the vehicle) and collects and processes driving behavior data collected from manually-operated vehicle. The driving behavior data may include various values describing how each manually-operated vehicle avoided an entity (e.g., a pedestrian). The computer system transmits the driving behavior to the automated vehicle, which in turn determines/generates an autonomous vehicle driving model for avoiding an entity. The vehicle then self-operates according to the model when the entity avoidance situation occurs on the road.

In an embodiment, the system includes a tracking system (e.g., a sensor system that senses the driving behavior of the vehicles and transmits the driving behavior to the computer system). The tracking system may include components installed in one or more manually-operated vehicles to track the driving behavior and components installed near a road to detect the driving behavior.

Using the Models of Human Driving Behavior in an Autonomous Vehicle

Figure 21:
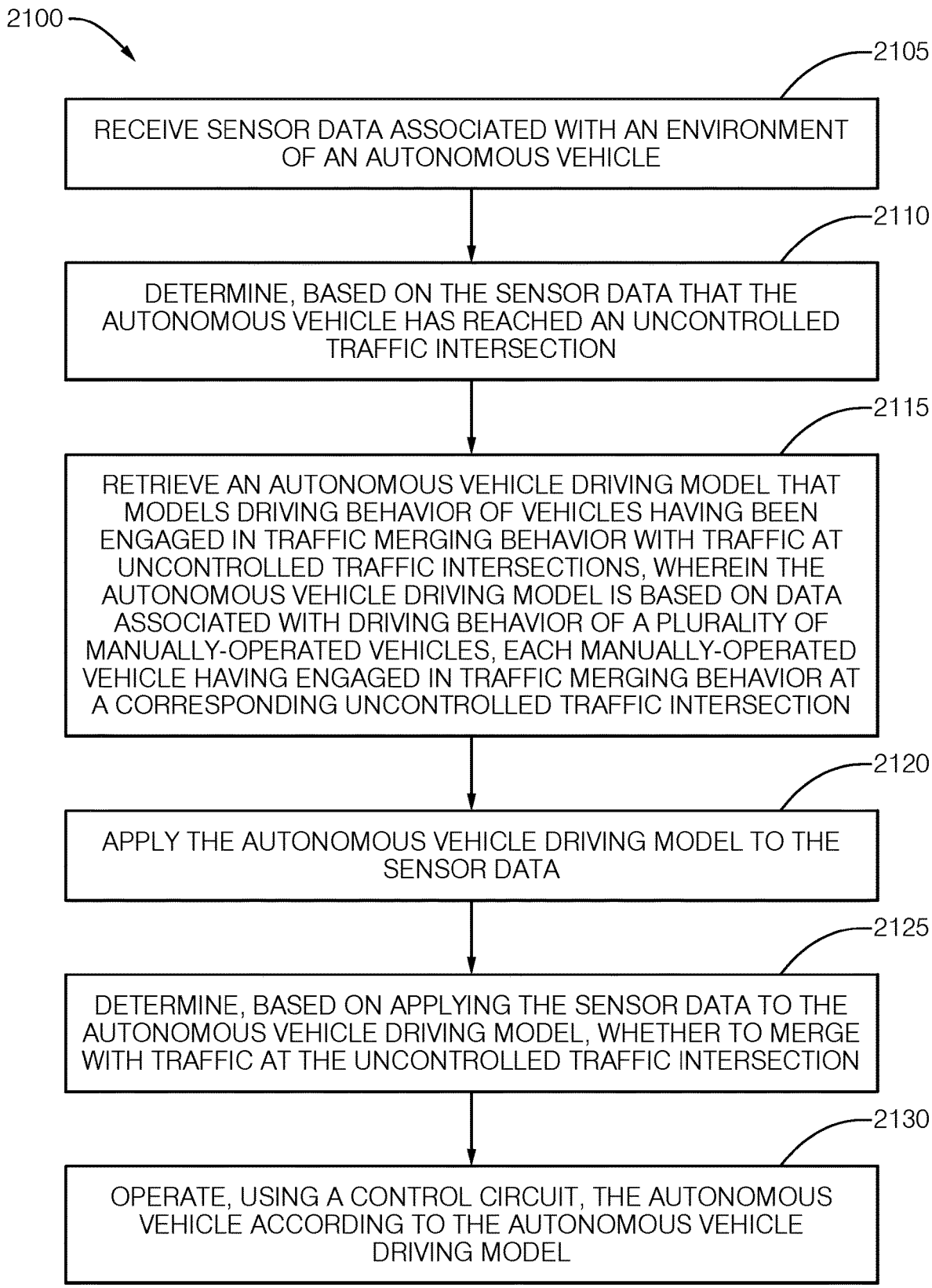
FIG. 21 illustrates actions that an autonomous vehicle may perform in order to use an autonomous vehicle driving model to drive through an uncontrolled traffic intersection.
Figure 22:
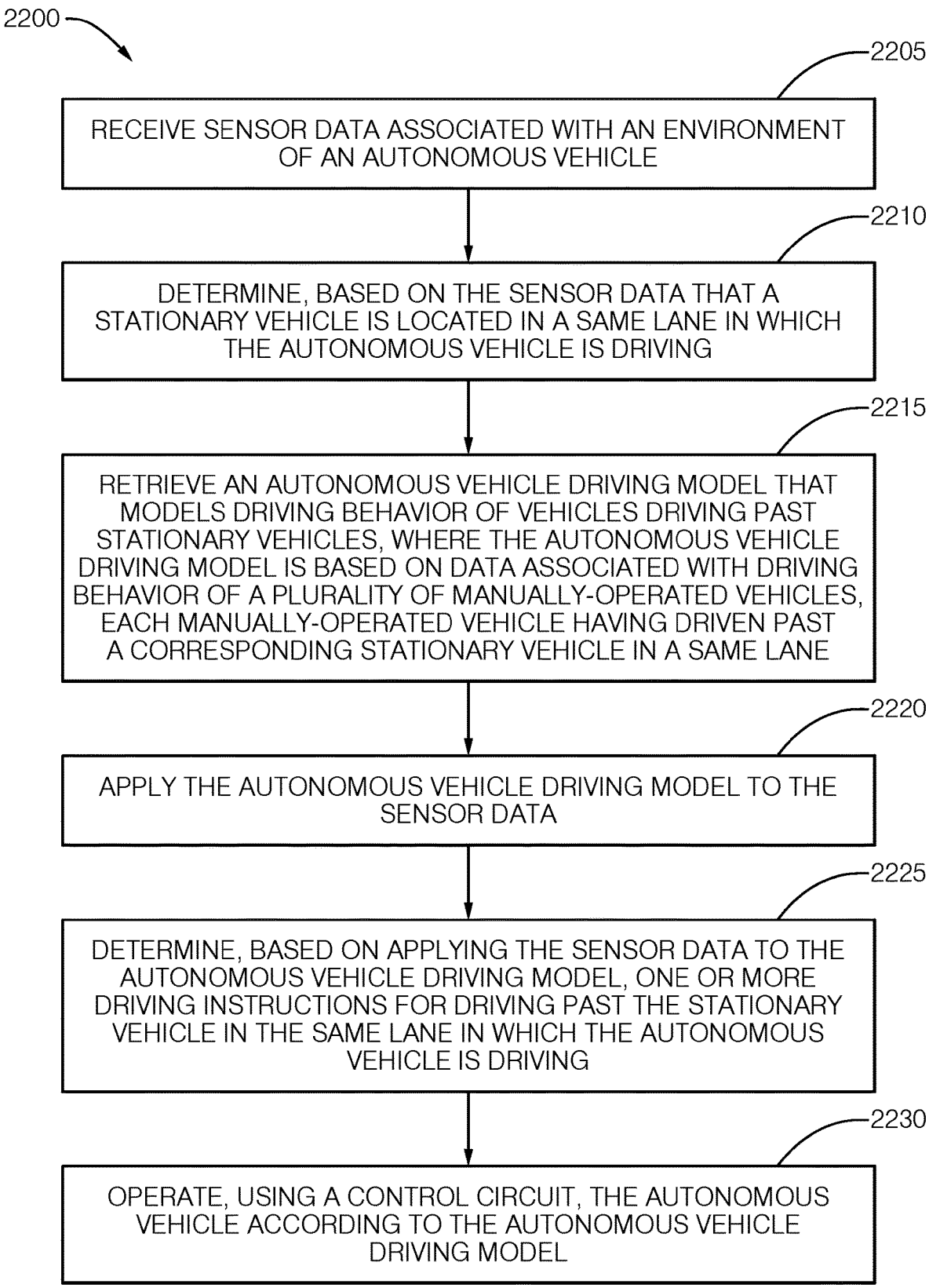
FIG. 22 illustrates actions that an autonomous vehicle may perform in order to use an autonomous vehicle driving model to drive past a stationary vehicle in the same lane.
Figure 23:
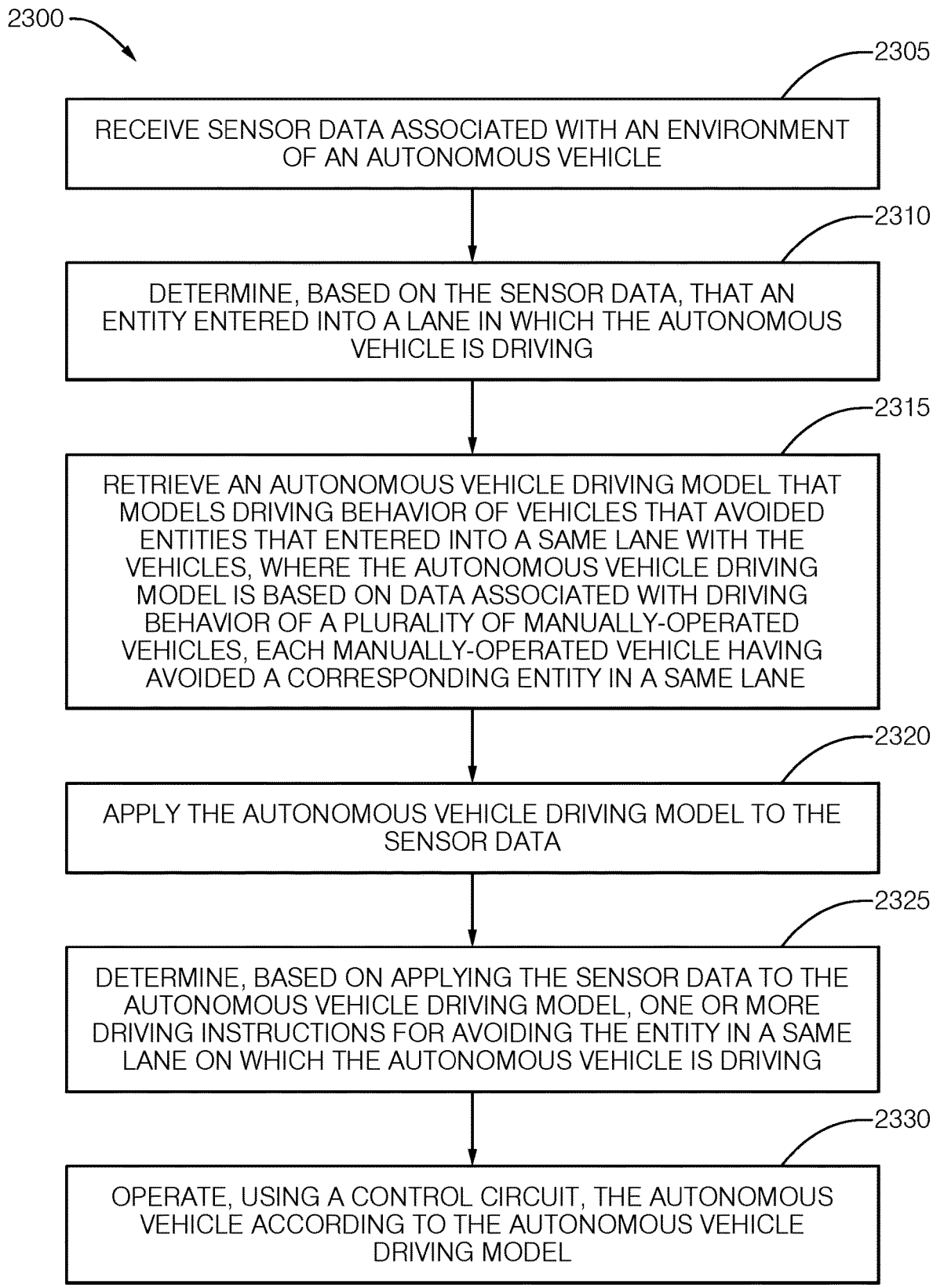
FIG. 23 illustrates actions that an autonomous vehicle may perform in order to use an autonomous vehicle driving model to avoid an entity (e.g., a pedestrian) in the same lane.

Various scenarios for building/generating autonomous vehicle driving models have been detailed in this disclosure. However, properly using the models is vital to the safety of the autonomous vehicles. FIGS. 21-23 illustrate actions that a processing circuit (e.g., of an autonomous vehicle performs when using the models in the driving scenarios described.

Process 2100 of FIG. 21 illustrates actions that an autonomous vehicle may perform in order to use an autonomous vehicle driving model to drive through an uncontrolled traffic intersection. FIG. 21 and other figures in this disclosure are described with a reference to a processing circuit performing the actions. However, a person skilled in the art would understand that the actions of FIG. 21 and other figures may be performed by other components (e.g., a processor 146, a perception module 402, a planning module 404, a control module 406 or another suitable component). In block 2105, a processing circuit (e.g., processor 146) receives sensor data associated with an environment of an autonomous vehicle. For example, the processing circuit may receive LiDAR data, RADAR data, camera data, and other suitable data. In block 2110, the processing circuit (e.g., processor 146) determines, based on the sensor data that the autonomous vehicle has reached an uncontrolled traffic intersection. For example, the processing circuit may analyze camera data in combination of LiDAR data to determine that the autonomous vehicle is at an uncontrolled intersection (e.g., there is no traffic light).

In block 2115, the processing circuit retrieves an autonomous vehicle driving model that models driving behavior of vehicles having been engaged in traffic merging behavior with traffic at uncontrolled traffic intersections. The autonomous vehicle driving model is based on data associated with driving behavior of a plurality of manually-operated vehicles where each manually-operated vehicle engaged in traffic merging behavior at a corresponding uncontrolled traffic intersection. For example, the processing circuit may retrieve the driving model from memory 144 (FIG. 1). In an embodiment, the processing circuit may retrieve the autonomous vehicle driving model from database 410. In an embodiment, the model can be trained at an intersection level. That is, the model is saved for a specific intersection and when the autonomous vehicle approaches the specific intersection, that intersection is detected, and the model is retrieved and used for that intersection. In an embodiment, the model can be trained at a city level. That is, the model is saved for a specific city and when the autonomous vehicle is detected to be in that city, the model is retrieved and used within that city. In an embodiment, the model can be used at a jurisdictional level or a country level. That is, when the autonomous vehicle is within a specific jurisdiction or in a specific country, the model is retrieved and used. A person skilled in the art would understand that, the use or level of use of the model can depend on homogeneity in driving laws and/or driving behaviors within an area.

In block 2120, the processing circuit applies the autonomous vehicle driving model to the sensor data. The autonomous vehicle driving model may include one or more rules (e.g., based on the driving behavior) and accept inputs of the vehicle's environment. The instructions within the autonomous driving model may instruct the processing circuit to apply the rules to the inputs to output instructions for the autonomous vehicle. Specifically, in block 2125, the processing circuit determines, based on applying the sensor data to the autonomous vehicle driving model, whether to merge with traffic at the uncontrolled traffic intersection. For example, as a result of applying the rules of the model to the sensor data, the processing circuit may receive an output of either proceed with merge or wait (e.g., for another opportunity to merge). In block 2130, the processing circuit operates, using a control circuit, the autonomous vehicle according to the autonomous vehicle driving model. For example, if the autonomous vehicle driving model outputs an instruction to proceed, the processing circuit instructs the control circuit to proceed with merging into the intersection. However, if the autonomous vehicle driving model outputs an instruction to wait, the processing circuit instructs the control circuit to wait (e.g., refrain from merging into the intersection).

In an embodiment, the processing circuit receiving, from one or more sensors, data representing a distance from the autonomous vehicle to an approaching vehicle driving towards the uncontrolled traffic intersection and data representing a speed of the approaching vehicle. For example, the autonomous vehicle can be equipped with a RADAR/LiDAR or a combination of these instruments. Those instruments may detect any vehicles that are approaching the autonomous vehicle and determine the speed and distance to the autonomous vehicle. In an embodiment, those instruments may be used to determine the distance of each other vehicle moving towards the intersection to a location at the intersection where the autonomous vehicle will be merging. For example, those instruments may determine the distance between the autonomous vehicle and the point at the intersection where the autonomous vehicle will merge and based on that distance and the distance to each other vehicle the processing circuit may determine the distance to the point at the intersection.

In an embodiment, the processing circuit, when applying the autonomous vehicle driving model to the sensor, performs the following actions. The processing circuit retrieves, from the autonomous vehicle driving model, a rule that includes a distance threshold and a speed threshold for merging into the uncontrolled traffic intersection. For example, the autonomous vehicle driving model may be stored as a data structure that includes rules (e.g., instantiated objects). Each rule takes an input and include a condition for the input. Based on whether the condition is met, the rule outputs different values. For example, one rule may include a condition for a distance threshold and a speed threshold. In another example, those conditions may be broken up in two rules. The threshold distance in the rule is the value added to the model when the mode is created. The value is based on the driving behavior as processed by the computer system described above.

The processing circuit compares the distance threshold with the distance received from the one or more sensors and the speed threshold with the speed received from the one or more sensors, and determines, based on the comparing, whether the distance received from the one or more sensors meets the distance threshold and the speed received from the one or more sensors matches the speed threshold. By this determination, the processing circuit determines whether one or more other vehicles driving towards the intersection are far enough and slow enough for the autonomous vehicle to have time to merge into the intersection. Based on the determination the rule outputs a result with an instruction on whether to merge with traffic. In embodiment, the processing circuit provides the autonomous vehicle with a command to merge or wait to merge with traffic at the uncontrolled traffic intersection based on a result of processing the distance and the speed.

Process 2200 of FIG. 22 illustrates actions that an autonomous vehicle may perform in order to use an autonomous vehicle driving model to drive past a stationary vehicle in the same lane. FIG. 22 and other figures in this disclosure are described with a reference to a processing circuit performing the actions. However, a person skilled in the art would understand that the actions of FIG. 22 and other figures may be performed by other components (e.g., a processor 146, a perception module 402, a planning module 404, a control module 406 or another suitable component). In block 2205, a processing circuit (e.g., processor 146) receives sensor data associated with an environment of an autonomous vehicle. For example, the processing circuit may receive LiDAR data, RADAR data, camera data, and other suitable data. In block 2210, the processing circuit (e.g., processor 146) determines, based on the sensor data that a stationary vehicle is located in a same lane in which the autonomous vehicle is driving. For example, the processing circuit may analyze camera data in combination of LiDAR data and RADAR data to determine that a stationary vehicle is in the same lane as the autonomous vehicle. Based on, at least, the RADAR and LiDAR data the processing circuit may determine the distance to the vehicle and that the vehicle is stationary (i.e., not moving).

In block 2215, the processing circuit retrieves an autonomous vehicle driving model that models driving behavior of vehicles driving past stationary vehicles. The autonomous vehicle driving model is based on data associated with driving behavior of a plurality of manually-operated vehicles where each manually-operated vehicle was driven past a corresponding stationary vehicle in a same lane. For example, the processing circuit may retrieve the driving model from the memory 144 (FIG. 1). In an embodiment, the processing circuit may retrieve the autonomous vehicle driving model from database 410.

In block 2220, the processing circuit applies the autonomous vehicle driving model to the sensor data. The autonomous vehicle driving model may include one or more rules (e.g., based on the driving behavior) and accept inputs of the vehicle's environment. The instructions within the autonomous driving model may instruct the processing circuit to apply the rules to the inputs to output instructions for the autonomous vehicle. Specifically, in block 2225, the processing circuit determines, based on applying the sensor data to the autonomous vehicle driving model, one or more driving instructions for driving past the stationary vehicle in the same lane in which the autonomous vehicle is driving. For example, as a result of applying the rules of the model to the sensor data, the processing circuit may receive an output of one or more instructions. For example, the instructions may include one or more of decelerate and change lanes into an adjacent lane. Under certain conditions, the processing circuit instructs the autonomous vehicle to stop. In block 2230, the processing circuit operates, using a control circuit, the autonomous vehicle according to the autonomous vehicle driving model. For example, if the autonomous vehicle driving model outputs an instruction to change lanes, the processing circuit instructs the control circuit to proceed with changing lanes.

In an embodiment, the processing circuit receives, from one or more sensors, one or more of, distance to the stationary vehicle, speed of the autonomous vehicle, distance between the stationary vehicle and another vehicle located in an adjacent lane to the stationary vehicle, direction of traffic in the adjacent lane, and other suitable data. For example, the processing circuit may instruct each available sensor what data the processing circuit requires to operate according to the model. When the processing circuit receives the data, the processing circuit applies the data to the autonomous vehicle driving mode.

In an embodiment, the processing circuit performs the following actions when applying the autonomous vehicle driving model to the sensor data. The processing circuit inputs the received sensor data into the autonomous vehicle driving model. That data includes one or more of the distance to the stationary vehicle, the speed of the autonomous vehicle, the distance between the stationary vehicle and another vehicle located in an adjacent lane to the stationary vehicle, and the direction of traffic in the adjacent lane. For example, the processing circuit may load the autonomous driving model into random access memory and run a process executing instructions associated with the autonomous driving model. Those instructions may include routines that accept inputs of the above indicated data. When the autonomous vehicle driving model receive the input, the routines of the model execute the model (e.g., one or more rules) on the data. For example, the autonomous vehicle driving model may be stored as a data structure that includes rules (e.g., instantiated objects). Each rule takes an input and include a condition for the input. Based on whether the condition is met, the rule outputs different values. For example, one rule may include a condition for a distance threshold and a speed threshold. In another example, those conditions may be broken up in two rules. The threshold distance in the rule is the value added to the model when the mode is created. The value is based on the driving behavior as processed by the computer system described above. The processing circuit receives output, from the autonomous vehicle driving model, that includes one or more commands for driving past the stationary vehicle. For example, when a speed and distance are input into the rule, the output may be one or more instructions (e.g., change lanes to an adjacent lane, speed up, slow-down, stop, or another suitable instruction).

Process 2300 of FIG. 23 illustrates actions that an autonomous vehicle may perform in order to use an autonomous vehicle driving model to avoid an entity (e.g., a pedestrian) in the same lane. FIG. 23 and other figures in this disclosure are described with a reference to a processing circuit performing the actions. However, a person skilled in the art would understand that the actions of FIG. 23 and other figures may be performed by other components (e.g., a processor 146, a perception module 402, a planning module 404, a control module 406 or another suitable component). In block 2305, a processing circuit (e.g., processor 146) receives sensor data associated with an environment of an autonomous vehicle. For example, the processing circuit may receive LiDAR data, RADAR data, camera data, and other suitable data. In block 2310, the processing circuit (e.g., processor 146) determines, based on the sensor data that an entity entered into a lane in which the autonomous vehicle is driving. For example, the processing circuit may analyze camera data in combination of LiDAR data and RADAR data to determine that a pedestrian is in the same lane as the autonomous vehicle. Based on, at least, the RADAR and LiDAR data the processing circuit may determine the distance to the pedestrian, the pedestrian's velocity (both speed and direction) and other suitable information.

In block 2315, the processing circuit retrieves an autonomous vehicle driving model that models driving behavior to avoid an entity in the same lane (i.e., in a vehicle's trajectory). The autonomous vehicle driving model is based on data associated with driving behavior of a plurality of manually-operated vehicles where each manually-operated vehicle was driven to avoid an entity (e.g., pedestrian, animal, or another suitable entity) in a same lane. For example, the processing circuit may retrieve the driving model from the memory 144 (FIG. 1). In an embodiment, the processing circuit may retrieve the autonomous vehicle driving model from database 410.

In block 2320, the processing circuit applies the autonomous vehicle driving model to the sensor data. The autonomous vehicle driving model may include one or more rules (e.g., based on the driving behavior) and accept inputs (e.g., the vehicle's speed, the distance to the entity, velocity (both speed and direction) of the entity, and other suitable information) of the vehicle's environment. The instructions within the autonomous driving model may instruct the processing circuit to apply the rules to the inputs to output instructions for the autonomous vehicle. Specifically, in block 2325, the processing circuit determines, based on applying the sensor data to the autonomous vehicle driving model, one or more driving instructions for avoiding an entity in the same lane in which the autonomous vehicle is driving. For example, as a result of applying the rules of the model to the sensor data, the processing circuit may receive an output of one or more instructions. For example, the instructions may include one or more of decelerate and change lanes into an adjacent lane. Under certain conditions, the processing circuit instructs the autonomous vehicle to stop. In block 2330, the processing circuit operates, using a control circuit, the autonomous vehicle according to the autonomous vehicle driving model. For example, if the autonomous vehicle driving model outputs an instruction to change lanes, the processing circuit instructs the control circuit to proceed with changing lanes.

In an embodiment, the sensor data associated with the environment of the autonomous vehicle includes one or more of speed of the autonomous vehicle, distance from the autonomous vehicle to the entity, a number of available lanes to the autonomous vehicle, a direction of traffic in each of the available lanes, a number of lanes crossed by the entity prior to entering the lane in which the autonomous vehicle is driving, whether the entity is crossing the lane at a designated crossing location, velocity of the entity, an angle at which the entity crosses the number of lanes prior to entering the lane in which the autonomous vehicle is driving, and other suitable sensor data.

In an embodiment, the processing circuit, when applying the autonomous vehicle driving model to the sensor data performs the following actions. The processing circuit inputs into the autonomous vehicle driving model one or more of the speed of the autonomous vehicle, the distance from the autonomous vehicle to the entity, the number of available lanes to the autonomous vehicle, the direction of traffic in each of the available lanes, the number of lanes crossed by the entity prior to entering the lane in which the autonomous vehicle is driving, whether the entity is crossing the lane at a designated crossing location, the velocity of the entity, and the angle at which the entity crosses the number of lanes prior to entering the lane in which the autonomous vehicle is driving. The processing circuit receives output, from the autonomous vehicle driving model that includes one or more commands for avoiding the entity.

For example, the autonomous vehicle may be driving in a middle lane of a three lane highway where all three lanes have traffic in the same direction. If the processing circuit detects a pedestrian in the same (middle) lane, the autonomous vehicle driving model may be used to get instructions for avoiding the pedestrian. The processing circuit receives data on the pedestrian's speed and direction (e.g., moving from left to right) as well as the speed of the autonomous vehicle and distance to the pedestrian. The processing circuit inputs that data into the model. The model may have a rule (e.g., generated based on driving behavior of manually-controlled vehicles) that indicates that if the autonomous vehicle is at least a certain distance from the pedestrian and is travelling slower than a certain speed while the pedestrian is moving left to right, the autonomous vehicle should change lanes to the left lane to avoid the pedestrian. The model outputs that instructions and the processing circuit transmit the instruction to the vehicle's control circuit for execution.

In an embodiment, the autonomous vehicle driving model is generated by processing circuit aboard the vehicle. The processing circuit on board the autonomous vehicle collects the driving behavior of a plurality of manually-operated vehicles. Data collection may include receiving the data from a central source or from the manually-operated vehicles themselves. In an embodiment, the autonomous vehicle uses it's sensors to collect the data as it drives on the same roads as manually-operated vehicles. The collected data may include data for one or more scenarios. For example, the collected data may include driving behavior of the plurality of manually-operated vehicles having engaged in traffic merging behavior at a corresponding uncontrolled intersection. The data may also include driving behavior of the plurality of manually-operated vehicles having been driven past a stationary vehicle in the same lane and/or driving behavior of the plurality of manually-operated vehicles having been driven to avoid the entity in the same lane.

When the data is received, the processing circuit generates a corresponding autonomous vehicle driving model. The control circuit may update a model based on supplemental data received. As discussed above, the autonomous vehicle driving models may be stored as a set of instructions and a set of data. That data and instructions may be generated on board the autonomous vehicle or at a location remote to the autonomous vehicle.

Generating Models for Human Driving Behavior Using Neural Networks

As previously discussed in this disclosure, human driving behavior can be used as a model for autonomous vehicle driving behavior for specific situations (e.g., merging into an uncontrolled intersection, driving past a stationary vehicle in the same lane, and driving around a pedestrian in the same lane). However, human driving behavior can be used as a model for other situation that an autonomous vehicle can encounter on the road. A neural network may be configured and trained for many situations where human driving behavior data is available. The neural network may be used as model for the autonomous vehicle in those situations on the road.

Figure 24:
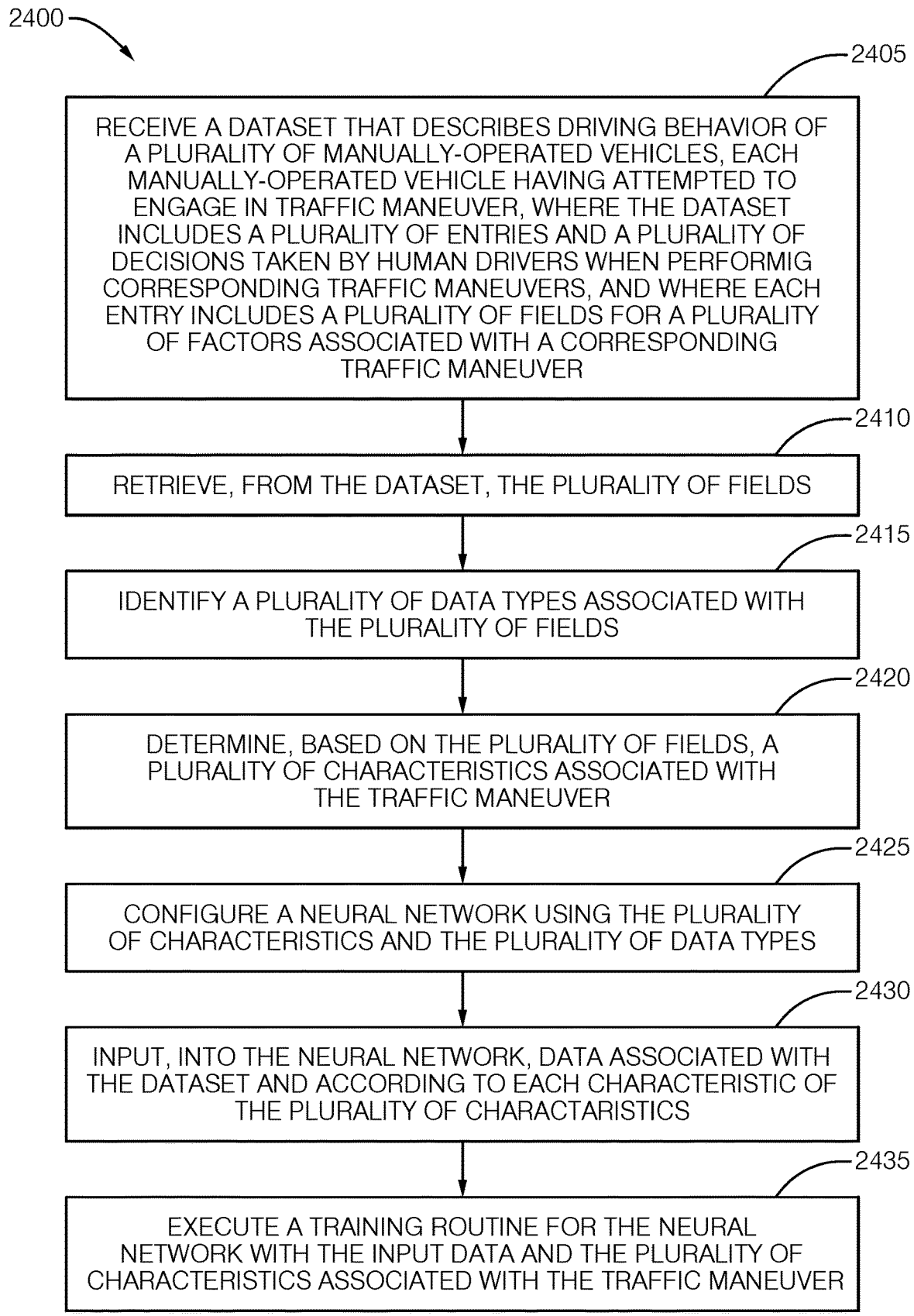
FIG. 24 illustrates actions that a computer system may perform to generate a model of human driving behavior for a specific traffic maneuver.

Process 2400 of FIG. 24 illustrates actions that a computer system may perform to generate a model of human driving behavior for a specific traffic maneuver. In block 2405, the computer system receives a dataset that describes driving behavior of a plurality of manually-operated vehicles, each manually-operated vehicle having attempted to engage in a traffic maneuver, where the dataset includes a plurality of entries and a plurality of decisions taken by human drivers when performing corresponding traffic maneuvers, and where each entry includes a plurality of fields for a plurality of factors associated with a corresponding traffic maneuver. For example, a field may be a table column that stores a data value for an aspect of a maneuver such as speed of the vehicle, distance to object, or another suitable value. Factors may be maneuver specific such that when a human decided to merge or not to merge into an intersection a factor may be one or more distances of one or more other cars to the intersection. In a model where avoid a pedestrian is modeled, a distance to the pedestrian may be a factor.

Figure 25:
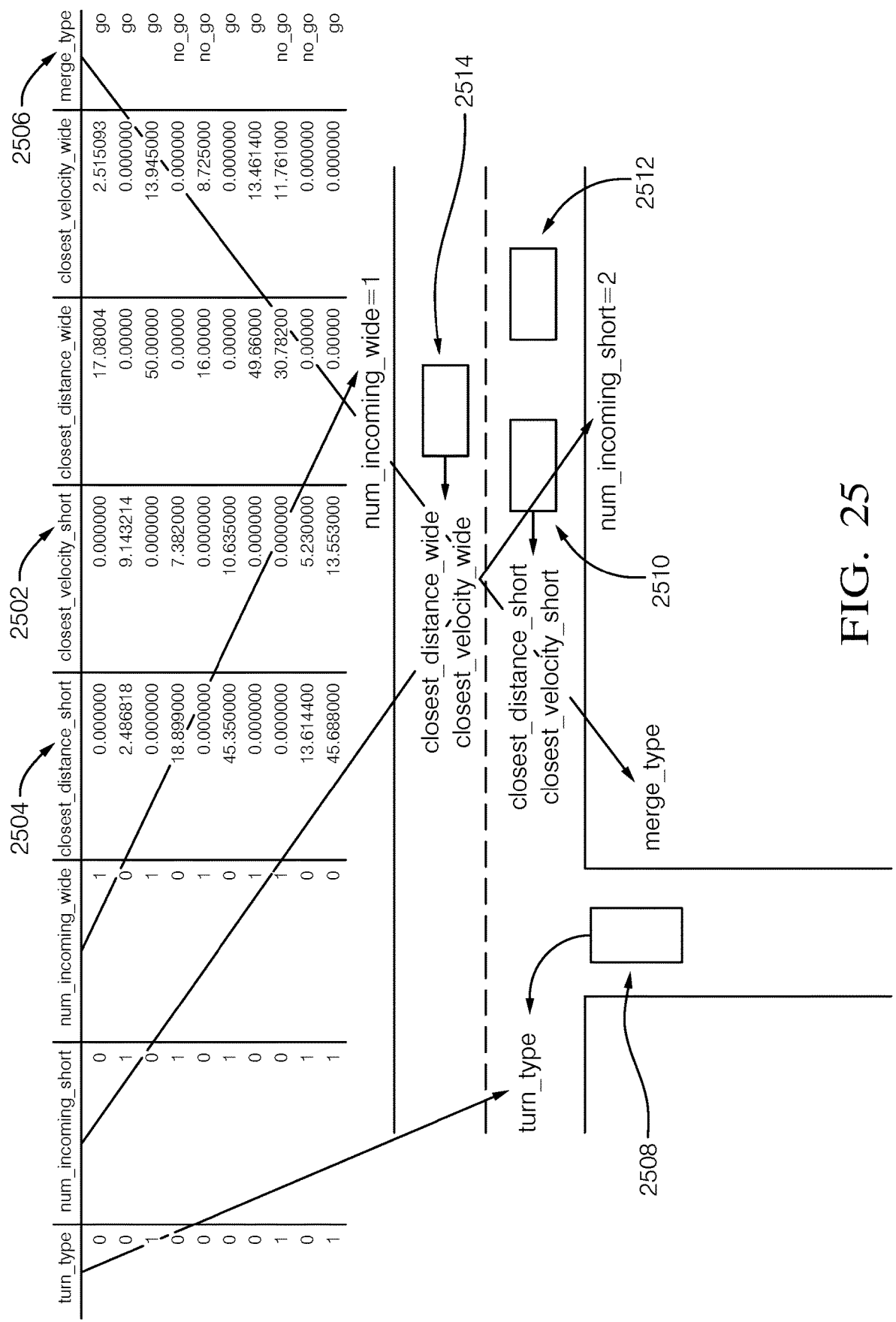
FIG. 25 illustrates one possible dataset that describes driving behavior of a plurality of manually-operated vehicles.

FIG. 25 illustrates one possible dataset that describes driving behavior of a plurality of manually-operated vehicles. Dataset 2502 includes a plurality of columns (e.g., fields) that have corresponding data values. For example, column 2504 represents a velocity of one of the vehicles that are approaching an intersection and column 2506 represents whether the human driver merged or refrained to merge (e.g., go/no go decision) in view of the data. In addition, FIG. 25 illustrates a scenario of merging into an uncontrolled intersection. Vehicle 2508 is a vehicle attempting to merge into an uncontrolled intersection. Vehicles 2510, 2512, and 2514 are other vehicles approaching the uncontrolled intersection. The velocities of those vehicles and distances of those vehicles are represented by the data in dataset 2502.

In block 2410, the computer system retrieves, from the dataset, the plurality of fields. For example, each column illustrated in FIG. 25 (e.g., columns 2504, 2506, and other columns) may be a field that is retrieved by the computer system. In an embodiment, the computer system parses the dataset to retrieve the fields. In another embodiment, the computer system performs an API call to retrieve the fields. The dataset may be stored in memory (e.g., random access memory) or in a data storage unit (e.g., data storage unit 142 of FIG. 1 or database 410 of FIG. 4). In an embodiment, a processing circuit (e.g., a processor) retrieves the received dataset from the data storage unit and copies it into memory for access and processing.

In an embodiment, the computer system may perform the following actions when retrieving, from the dataset, the plurality of fields. The computer system executes, using an application programming interface ("API") associated with the dataset, a command requesting the plurality of fields, and receives, in response to the command, a plurality of identifiers associated with the plurality of fields. For the example, the dataset may be accessed by a suite of APIs which may be use to extract various information from the dataset. The computer system may use those APIs to extract the plurality of identifiers.

In block 2415, the computer system identifies a plurality of data types associated with the plurality of fields. For example, as illustrated in FIG. 25 the dataset may include different fields. Some of the fields may be of a numeric type (i.e., include numeric values). Some fields may be of a Boolean type (i.e., include Boolean data). Other fields may be of a type that includes a limited set. For example, a field may have one of four values (e.g., strings, alphanumeric characters, and other suitable values). The computer system may identify the data types by accessing the data set and determining what kind of values are in each column (i.e., field). In an embodiment, the computer system may generate and execute an API call to get a type of each field.

In an embodiment, the computer system identifies the plurality of data types associated with the plurality of fields by taking the following actions. The computer system selects, for each of the plurality of fields, an identifier associated with a corresponding field. For example each field may include an identifier. The identifier may be a field name (e.g., vehicle speed). In various embodiments, the identifier may be an alphanumeric string, a hexadecimal number, or another suitable identifier. The computer system compares each selected identifier with a plurality of identifiers associated with known data types. For example, the computer system may have access to a storage location where the identifiers are stored (e.g., in a table) with corresponding types. The computer system may iterate through each identifier and compare the identifier to the stored identifiers and when a match is found, the computer system identifies, based on the comparing a corresponding data type for each of the plurality of fields.

In block 2420, the computer system determines, based on the plurality of fields, a plurality of characteristics associated with the traffic maneuver. In an embodiment, each field is a characteristic of a traffic maneuver. For example, FIG. 25 illustrates characteristics such as turn type, incoming vehicles, distance to those vehicles, speed or velocity of those vehicles, as well as other characteristics. FIG. 25 also illustrates a result of the maneuver (e.g., whether the human driver merges into the intersection or not.

In block 2425, the computer system configures a neural network using the plurality of characteristics and the plurality of data types. For example, the computer system may configure an input layer, a hidden layer, and an output layer of the neural network. The hidden layer may have several layers depending on the output need for the specific maneuver. For example, if a yes/no decision is expected output (e.g., whether to proceed through an uncontrolled intersection or not) only one hidden layer may be needed to process the input. However, if more complex output is needed (e.g., driving instructions around a stationary vehicle in the same lane or a pedestrian in the same lane) more than a single hidden layer may be configured by the computer system. In addition, the computer system configures an input layer to the neural network. The computer system may configure the input layer with a plurality of input parameters and the types of input parameters. For example, when configuring the input layer of the neural network the computer system may use the plurality of characteristics and the plurality of data types retrieved from the dataset. The computer system may use characteristics such as speed of the autonomous vehicle, distance to a specific entity (e.g., a stationary vehicle or a pedestrian), speed of the entity, travel direction of the entity, and other suitable characteristics. The computer system may also use the type of characteristic to configure the neural network.

In an embodiment, the computer system configures a number of inputs based on a number of the characteristics in the plurality of characteristics associated with the traffic maneuver, and selects for each of the plurality of characteristics a plurality of starting weights. For example, for a decision on whether to merge into an intersection, each distance of each other vehicle to the intersection may have a weight of 0.6 on a scale of zero to one. As the neural network is trained those weights change based on the training set. The computer system then generates the neural network, for example, using an application program interface ("API") function. The API function takes as input the plurality of characteristics, a type of field associated with each characteristic of the plurality of characteristics, and the type of the neural network.

In block 2430, the computer system inputs, into the neural network, data associated with the dataset and according to each characteristic of the plurality of characteristics. When the neural network is created, it is trained using the dataset. Thus, the data of the dataset is input into the neural network in such a way that each characteristic of the neural network corresponds to a field in dataset. For example, when inputting data into the neural network, the characteristic for vehicle velocity in the neural network matches the field of vehicle velocity in the dataset.

In block 2435, the computer system executes a training routine for the neural network with the input data and the plurality of characteristics associated with the traffic maneuver. For example, the computer system may execute a function corresponding to a training routine. The function may be executed with the dataset as the input. In an embodiment, the function may enable inputting a path to the dataset where the function is able to read the training data from the dataset.

In an embodiment, the neural network is trained away from any autonomous vehicle (e.g., at a central location, the factory, or another suitable location). Training neural networks outside the autonomous vehicle may have various advantages. For example, in scenarios where the autonomous vehicles have limited processing power, enable quicker training for neural networks. In addition, training neural networks outside of vehicle (e.g., at a datacenter) enables quick distribution of trained networks (i.e., each vehicle is not required to trained each neural network). Thus, in the embodiments where neural networks are trained outside of the autonomous vehicles, the neural networks are transmitted to one or more autonomous vehicles, as required.

In an embodiment, when the neural networks are generated and trained, they may be used by autonomous vehicles in the driving scenarios that they are designed for. Specifically, a computer system (e.g., at an autonomous vehicle)

receives sensor data from one or more sensors of an autonomous vehicle. In an embodiment, the computer system may be located on board of the autonomous vehicle. For example, the computer system may be a module on-board the autonomous vehicle and may interface with other components of the autonomous vehicle (e.g., components 142, 144, 146, and other components associated with FIG. 1). The computer system may have some or all components of FIG. 3. In an embodiment, the computer system may interface with components of FIG. 4. In an embodiment, the model can be trained at an intersection/road level. That is, the model is saved for a specific intersection/road and when the autonomous vehicle approaches the specific intersection/road, that intersection/road is detected, and the model is retrieved and used for that intersection/road. In an embodiment, the model can be trained at a city level. That is, the mode is saved for a specific city and when the autonomous vehicle is detected to be in that city, the model is retrieved and used within that city. In an embodiment, the model can be used at a jurisdictional level or a country level. That is, when the autonomous vehicle is within a specific jurisdiction or in a specific country, the model is retrieved and used. A person skilled in the art would understand that, the use or level of use of the model can depend on homogeneity in driving laws and/or driving behaviors within an area.

In an embodiment, the computer system may be located outside of the autonomous vehicle and information between the vehicle and the computer system hosting the model may be transmitted via a wireless network. For example, the autonomous vehicle may collect sensor data as it is driving and may transmit the data to a central location. At the central location a computer system may process the data and transmit to the autonomous vehicle driving instructions.

In an embodiment, the computer system, selects, based on the sensor data, the traffic maneuver to navigate through a portion of a trajectory. For example, the computer system may receive sensor data (e.g., remotely on on-board the autonomous vehicle) and determine that a specific maneuver is needed to be performed to continue traveling on the path to the desired destination. The computer system may determine whether there is a neural network available that is associated with the selected maneuver. The computer system extracts, from the sensor data, one or more values corresponding to the plurality characteristics and executes the neural network with the one or more of the plurality of characteristics as input data. For example, if the required maneuver is merging into an uncontrolled intersection, the computer system extracts from the sensor data characteristics such as speed of the autonomous vehicle, speed and direction of movement of each other vehicle approaching the uncontrolled intersection, distance of each other vehicle to the uncontrolled intersection, lane of each other vehicle and direction of each lane. In an embodiment, other characteristics may be extracted from the sensor data. The neural network is then executed with the input data The computer system receives output from the neural network and operates, using a control circuit, the autonomous vehicle based on the output of the neural network. For example, in a scenario where a decision must be made whether to proceed into an uncontrolled intersection or wait for other vehicles or entities to pass, the computer system may output a Boolean that signals the autonomous vehicle to proceed or wait. In an embodiment, the output may be one or more commands to proceed. For example, the command may include a speed with which the autonomous vehicle should proceed and also in what direction (e.g., whether the position of the wheels needs to be adjust).

In an embodiment, the computer system uses the neural network itself to determine what data needs to be extracted from the sensor data. Specifically, the computer system retrieves, from the neural network a plurality of identifiers associated with the plurality of characteristics. For example, the neural network may include an application programming interface that enables a request for characteristics of the traffic maneuver that the neural network will accept as input. Each neural network (i.e., for different maneuvers) may accept different characteristics as input. The computer system may receive in the response to the request identifiers of the characteristics that the neural network may accept. The identifiers may be simply names of the characteristics. In an embodiment, each identifier may be an alphanumeric string that represents a specific characteristic. The autonomous vehicle may include a listing (e.g., a table) that includes the identifiers and corresponding characteristics.

The computer system compares each of the plurality of identifiers with identifiers of data values in the sensor data, and retrieves, based on the comparing, the one or more values corresponding to the plurality of characteristics. For example, for a maneuver involving a merge into an uncontrolled traffic intersection the characteristics may include one or more identifiers of one or more other vehicles driving towards an intersection, a speed of each of the one or more other vehicle driving towards the intersection, a distance of each of the one or more other vehicle from the particular vehicle to the intersection, a lane of each of the one or more other vehicle driving towards the intersection, a speed of the autonomous vehicle, a distance of the autonomous vehicle to the intersection, and other suitable characteristics.

In an embodiment that includes a scenario of merging into an uncontrolled traffic intersection, the computer system may receive an output of the neural network as an indication whether the autonomous vehicle should merge into the intersection or refrain from merging into the intersection. The indication may be a Boolean value output (e.g., yes/no, one/zero, or another suitable indication). In an embodiment, in response to receiving the indication to merge into the intersection, the computer system generates one or more driving commands to operate the autonomous vehicle to merge into the intersection. In other embodiments, the neural network may output driving instructions instead of or in addition to the indication. For example, the neural network may output a heading and a speed to proceed. If the output of the neural network is to refrain from merging, the output of speed may be zero.

In an embodiment, in response to receiving the indication to refrain from merging into the intersection, after a threshold period of time has passed, the computer system may execute the neural network with updated sensor data. For example, in addition to an output indicating that the autonomous vehicle should refrain from merging into the uncontrolled traffic intersection, the neural network may output data relating to the time to wait until executing the neural network again. That time may be based on a time it takes for a condition to be removed (e.g., another vehicle approaching the uncontrolled intersection that is too close for a merging maneuver).

As discussed above, some neural networks may be configured to output one or more driving commands, and those driving commands may be used by the autonomous vehicle to self-operate (e.g., by instructing the control circuit to operate the autonomous vehicle based on the one or more driving commands). For example, the computer system may receive the driving commands as output of the neural network and transmit those commands to a control circuit of the vehicle. The driving commands may include instructions to perform a specific maneuver. The control circuit of the vehicle may adjust the instructions based on the orientation and position of the vehicle (e.g., modify the instructions to fit the scenario).

The above discussed actions may be performed at an autonomous vehicle which may include one or more computer processors and one or more non-transitory storage media storing instructions which, when executed by the one or more computer processors, cause performance of the actions described in this disclosure. Additionally or alternatively, commands for performing the actions described in this disclosure may be stored on one or more non-transitory storage media which, when executed by one or more computing devices, cause performance of the commands.

In the foregoing description, embodiments of the disclosure have been described with reference to numerous specific details that may vary from implementation to implementation. The description and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer-implemented method comprising:
   determining, by at least one processor, driving behavior of a plurality of manually-operated vehicles, each manually-operated vehicle having engaged in traffic merging behavior at a corresponding uncontrolled traffic intersection;
   determining, by the at least one processor, an autonomous vehicle driving model comprising a neural network, wherein data associated with manually-operated vehicles is input to the neural network in order to train the neural network to implement an autonomous vehicle driving behavior of an autonomous vehicle driving to merge with traffic at an uncontrolled traffic intersection; and
   controlling, by the at least one processor, at least one control function of the autonomous vehicle according to the autonomous vehicle driving model.

2. The method of claim 1, wherein determining the driving behavior of the plurality of manually-operated vehicles comprises sensing the driving behavior at or near one or more uncontrolled traffic intersections.

3. The method of claim 1, wherein determining the driving behavior comprises:
   identifying a vehicle that merged into a corresponding uncontrolled traffic intersection; and
   determining (1) respective speeds of the plurality of manually-operated vehicles driving towards the corresponding uncontrolled traffic intersection, (2) a distance of each other vehicle of the plurality of manually-operated vehicles from the vehicle that merged and (3) a lane of each of the plurality of manually-operated vehicles.

4. The method of claim 1, wherein determining the driving behavior comprises:
   identifying vehicles that did not merge into the corresponding uncontrolled traffic intersection; and
   for each vehicle of the vehicles that did not merge into the corresponding uncontrolled traffic intersection, determining respective speeds of the plurality of manually-operated vehicles in a vicinity of the each vehicle that were driving towards the corresponding uncontrolled traffic intersection, a distance of each other vehicle of the plurality of manually-operated vehicles from each vehicle that did not merge and a lane of each other vehicle of the plurality of manually-operated vehicles.

5. The method of claim 1, wherein determining the driving behavior of the plurality of manually-operated vehicles comprises:
   collecting data;
   identifying a data set from the collected data; and
   fitting the data set to a baseline model.

6. The method of claim 1, wherein the driving behavior includes a velocity and a heading of each manually-operated vehicle.

7. The method of claim 1, wherein the autonomous vehicle driving model maps, for a particular vehicle that was driving towards the uncontrolled traffic intersection, a speed of the plurality of manually-operated vehicles driving towards the uncontrolled traffic intersection, a distance of each other vehicle from the particular vehicle and a lane of each other vehicle.

8. The method of claim 1, wherein determining the driving behavior comprises determining whether the plurality of manually-operated vehicles attempted to merge with traffic at the uncontrolled traffic intersection or did not attempt to merge with traffic at the uncontrolled traffic intersection.

9. A system, comprising:
   at least one processor, and
   at least one non-transitory storage media storing instructions that, when executed by the at least one processor, cause the at least one processor to:
   determine driving behavior of a plurality of manually-operated vehicles, each manually-operated vehicle having engaged in traffic merging behavior at a corresponding uncontrolled traffic intersection;
   determine an autonomous vehicle driving model comprising a neural network, wherein data associated with manually-operated vehicles is input to the neural network in order to train the neural network to implement an autonomous vehicle driving behavior of an autonomous vehicle driving to merge with traffic at an uncontrolled traffic intersection; and
   control at least one control function of the autonomous vehicle according to the autonomous vehicle driving model.

10. The system of claim 9, wherein a tracking system at or near one or more uncontrolled traffic intersections senses the driving behavior of the plurality of manually-operated vehicles.

11. The system of claim 9, wherein determining the driving behavior comprises:
   identifying a vehicle that merged into a corresponding uncontrolled traffic intersection; and
   determining (1) respective speeds of the plurality of manually-operated vehicles driving towards the corresponding uncontrolled traffic intersection, (2) a distance of each other vehicle of the plurality of manually-operated vehicles from the vehicle that merged and (3) a lane of each of the plurality of manually-operated vehicles.

12. The system of claim 9, wherein determining the driving behavior comprises:
   identifying vehicles that did not merge into the corresponding uncontrolled traffic intersection; and
   for each vehicle of the vehicles that did not merge into the corresponding uncontrolled traffic intersection, determining respective speeds of the plurality of manually-operated vehicles in a vicinity of the each vehicle that were driving towards the corresponding uncontrolled traffic intersection, a distance of each other vehicle of the plurality of manually-operated vehicles from each vehicle that did not merge and a lane of each other vehicle of the plurality of manually-operated vehicles.

13. The system of claim 9, wherein determining the driving behavior of the plurality of manually-operated vehicles comprises:
   collecting data;
   identifying a data set from the collected data; and
   fitting the data set to a baseline model.

14. The system of claim 9, wherein the driving behavior includes a velocity and a heading of each manually-operated vehicle.

15. The system of claim 9, wherein the autonomous vehicle driving model maps, for a particular vehicle that was driving towards the uncontrolled traffic intersection, a speed of the plurality of manually-operated vehicles driving towards the uncontrolled traffic intersection, a distance of each other vehicle from the particular vehicle and a lane of each other vehicle.

16. The system of claim 9, wherein determining the driving behavior comprises determining whether the manually-operated vehicle attempted to merge with traffic at the uncontrolled traffic intersection or did not attempt to merge with traffic at the uncontrolled traffic intersection.

17. A non-transitory storage medium storing instructions that, when executed by at least one processor, cause the at least one processor to:
   determine driving behavior of a plurality of manually-operated vehicles, each manually-operated vehicle having engaged in traffic merging behavior at a corresponding uncontrolled traffic intersection;
   determine an autonomous vehicle driving model comprising a neural network, wherein data associated with manually-operated vehicles is input to the neural network in order to train the neural network to implement an autonomous vehicle driving behavior of an autonomous vehicle driving to merge with traffic at an uncontrolled traffic intersection; and
   control at least one control function of the autonomous vehicle according to the autonomous vehicle driving model.

18. The non-transitory storage medium of claim 17, wherein determining the driving behavior of the plurality of manually-operated vehicles comprises sensing the driving behavior at or near one or more uncontrolled traffic intersections.

* * * * *